US012292381B2

(12) United States Patent
Taguchi

(10) Patent No.: US 12,292,381 B2
(45) Date of Patent: May 6, 2025

(54) FLUORESCENCE OBSERVATION APPARATUS, FLUORESCENCE OBSERVATION SYSTEM, AND FLUORESCENCE OBSERVATION METHOD

(71) Applicant: SONY GROUP CORPORATION, Tokyo (JP)

(72) Inventor: Ayumu Taguchi, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 255 days.

(21) Appl. No.: 17/996,353

(22) PCT Filed: Apr. 7, 2021

(86) PCT No.: PCT/JP2021/014734
§ 371 (c)(1),
(2) Date: Oct. 17, 2022

(87) PCT Pub. No.: WO2021/215248
PCT Pub. Date: Oct. 28, 2021

(65) Prior Publication Data
US 2023/0213450 A1     Jul. 6, 2023

(30) Foreign Application Priority Data

Apr. 25, 2020   (JP) .................................. 2020-077859

(51) Int. Cl.
*G01N 21/64*   (2006.01)
(52) U.S. Cl.
CPC ..... *G01N 21/6486* (2013.01); *G01N 21/6408* (2013.01); *G01N 2021/641* (2013.01)

(58) Field of Classification Search
CPC .......... G01N 21/6486; G01N 21/6408; G01N 2021/641; G01N 2021/6419;
(Continued)

(56) References Cited

U.S. PATENT DOCUMENTS

2013/0135456 A1*   5/2013   Kishima .................. H04N 7/18
348/79

FOREIGN PATENT DOCUMENTS

JP      2006-275858 A     10/2006
JP      2012-003198 A      1/2012
(Continued)

OTHER PUBLICATIONS

International Search Report and Written Opinion of PCT Application No. PCT/JP2021/014734, issued on Jun. 8, 2021, 09 pages of ISRWO.

*Primary Examiner* — Courtney D Thomas
(74) *Attorney, Agent, or Firm* — CHIP LAW GROUP

(57) ABSTRACT

A fluorescence observation apparatus includes an irradiation unit that applies a plurality of kinds of excitation light of mutually different wavelengths to a plurality of spatially or temporally different positions in a biological sample that is labeled with a composite phosphor containing two or more kinds of fluorescent molecules at a predetermined composition ratio, a detection unit that detects fluorescence generated at each of the plurality of positions by application of the irradiation unit, and a calculation unit that determines a distribution of pieces of the composite phosphor on the basis of a fluorescence signal that is obtained from a detection result of the detection unit and that shows a fluorescence intensity corresponding to a position in the biological sample of each piece of the fluorescence.

16 Claims, 10 Drawing Sheets

(58) Field of Classification Search
CPC ....... G01N 2021/6421; G01N 21/6458; G02B 21/0076; G02B 21/365
See application file for complete search history.

(56) References Cited

FOREIGN PATENT DOCUMENTS

| | | |
|---|---|---|
| JP | 2017-219400 A | 12/2017 |
| WO | 2019/031584 A1 | 2/2019 |
| WO | 2019/230878 A1 | 12/2019 |

\* cited by examiner

FIG.2

| | KIND OF FLUORESCENT MOLECULE | EXCITATION FLUORESCENCE CHARACTERISTICS OF FLUORESCENT MOLECULE | | COMPO-SITION RATIO |
|---|---|---|---|---|
| COMPOSITE PHOSPHOR | FLUORESCENT MOLECULE A | FIRST KIND OF EXCITATION LIGHT (FIRST WAVELENGTH $\lambda_1$) | FIRST KIND OF FLUORESCENCE (FIRST SPECTRUM) | 1 |
| | FLUORESCENT MOLECULE B | SECOND KIND OF EXCITATION LIGHT (SECOND WAVELENGTH $\lambda_2$) | SECOND KIND OF FLUORESCENCE (SECOND SPECTRUM) | 2 |
| | ... | ... | ... | ... |

FIG.3

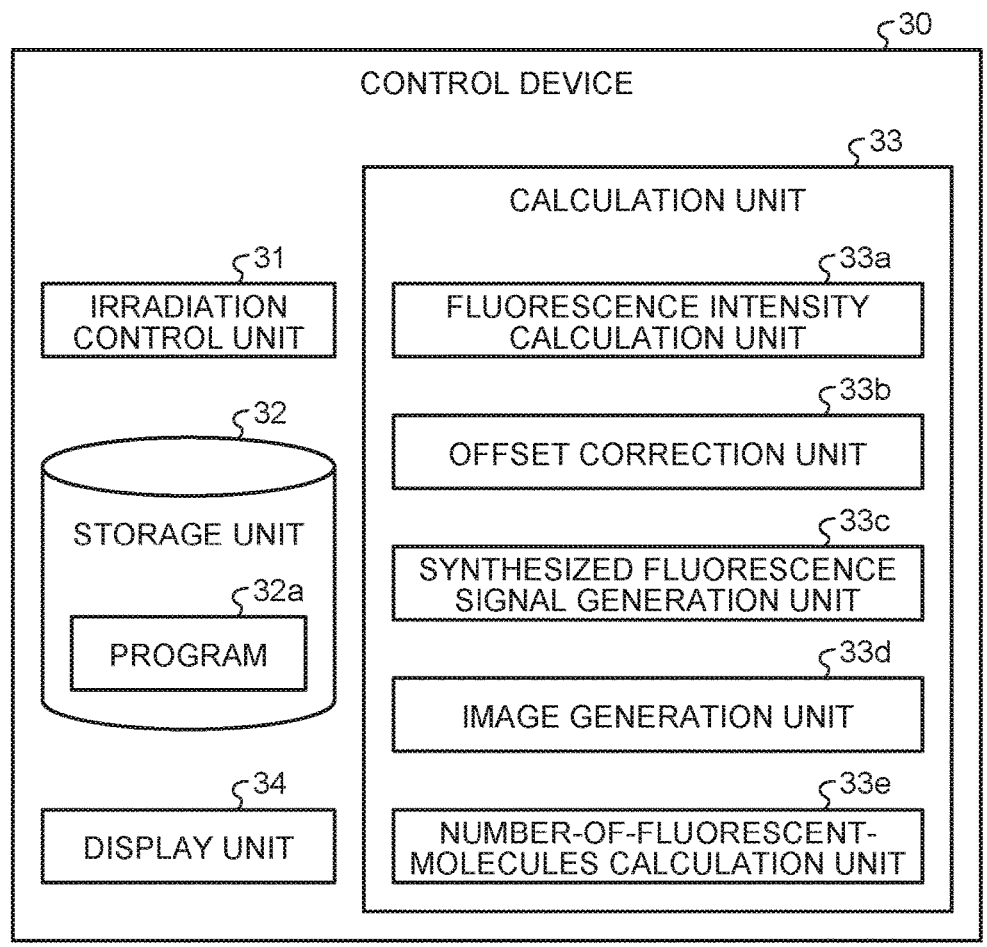

FLUORESCENCE OBSERVATION APPARATUS, FLUORESCENCE OBSERVATION SYSTEM, AND FLUORESCENCE OBSERVATION METHOD

CROSS REFERENCE TO RELATED APPLICATIONS

This application is a U.S. National Phase of International Patent Application No. PCT/JP2021/014734 filed on Apr. 7, 2021, which claims priority benefit of Japanese Patent Application No. JP 2020-077859 filed in the Japan Patent Office on Apr. 25, 2020. Each of the above-referenced applications is hereby incorporated herein by reference in its entirety.

FIELD

The present disclosure relates to a fluorescence observation apparatus, a fluorescence observation system, and a fluorescence observation method.

BACKGROUND

It is known that in the field of, for example, cancer immunotherapy or the like, fluorescence observation is performed in order to grasp the positions of various antibodies such as a PD-L1 antibody.

CITATION LIST

Patent Literature

Patent Literature 1: WO 2019/230878 A

SUMMARY

Technical Problem

Multicoloring of a fluorescence image to be subjected to fluorescence observation or the like is being advanced. In order to make it easier to distinguish each color in such a fluorescence image, it is necessary to improve the resolution of fluorescence detection.

An object of the present disclosure is to provide a fluorescence observation apparatus, a fluorescence observation system, and a fluorescence observation method capable of improving the resolution of fluorescence detection.

Solution to Problem

A fluorescence observation apparatus according to one aspect of the present disclosure includes: an irradiation unit that applies a plurality of kinds of excitation light of mutually different wavelengths to a plurality of spatially or temporally different positions in a biological sample that is labeled with a composite phosphor containing two or more kinds of fluorescent molecules at a predetermined composition ratio; a detection unit that detects fluorescence generated at each of the plurality of positions by application of the irradiation unit; and a calculation unit that determines a distribution of pieces of the composite phosphor on the basis of a fluorescence signal that is obtained from a detection result of the detection unit and that shows a fluorescence intensity corresponding to a position in the biological sample of each piece of the fluorescence.

A fluorescence observation system according to ones aspect of the present disclosure includes: a fluorescence observation apparatus including an irradiation unit that applies a plurality of kinds of excitation light of mutually different wavelengths to a plurality of spatially or temporally different positions in a biological sample that is labeled with a composite phosphor containing two or more kinds of fluorescent molecules at a predetermined composition ratio and a detection unit that detects fluorescence generated at each of the plurality of positions by application of the irradiation unit; and software used for processing using a detection result of the detection unit, wherein the software is executed by the fluorescence observation apparatus, and implements determination of a distribution of pieces of the composite phosphor on the basis of a fluorescence signal that is obtained from a detection result of the detection unit and that shows a fluorescence intensity corresponding to a position in the biological sample of each piece of the fluorescence.

A fluorescence observation method according to one aspect of the present disclosure includes: applying a plurality of kinds of excitation light of mutually different wavelengths to a plurality of spatially or temporally different positions in a biological sample that is labeled with a composite phosphor containing two or more kinds of fluorescent molecules at a predetermined composition ratio; detecting fluorescence generated at each of the plurality of positions by the applying; and determining a distribution of pieces of the composite phosphor on the basis of a fluorescence signal that is obtained from a result of the detecting and that shows a fluorescence intensity corresponding to a position in the biological sample of each piece of the fluorescence.

BRIEF DESCRIPTION OF DRAWINGS

FIG. 2 is a diagram illustrating an example of a composition of a composite phosphor.

FIG. 3 is a diagram illustrating an example of functional blocks of a control device.

DESCRIPTION OF EMBODIMENTS

Figure 1A:
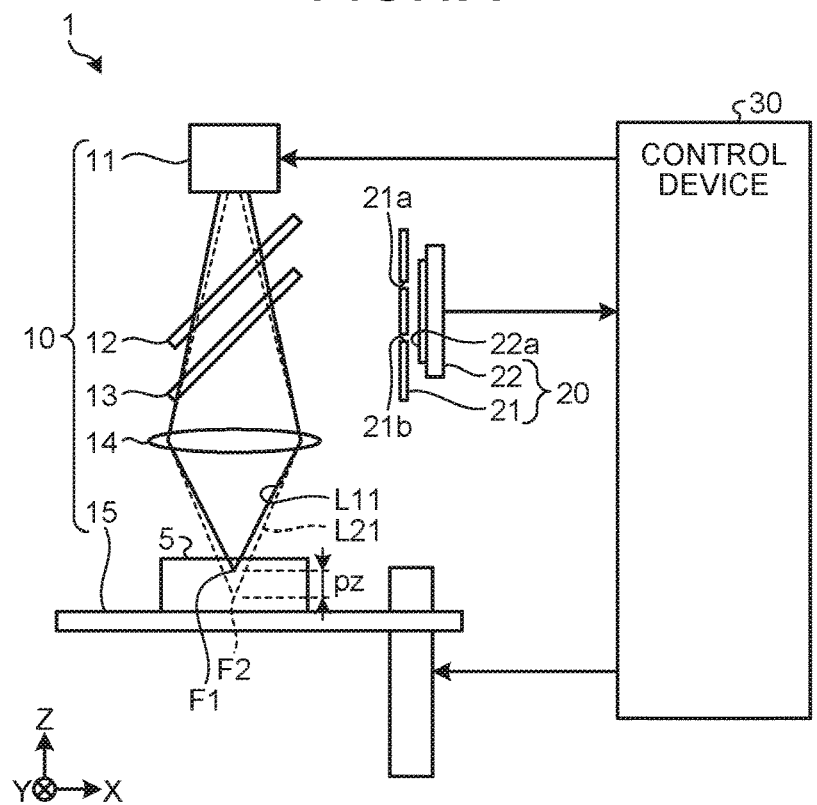
FIG. 1A is a diagram illustrating an example of a schematic configuration of a fluorescence observation apparatus according to a first embodiment.

Hereinbelow, embodiments of the present disclosure are described in detail on the basis of the drawings. In each of the following embodiments, the same parts are denoted by the same reference numerals, and a repeated description is omitted.

The present disclosure is described according to the following order of items.
1. Introduction
2. First Embodiment
3. Second Embodiment
4. Example of hardware configuration of control device
5. Effects 1. Introduction In fluorescence observation, for example, a confocal fluorescence microscope is used. A conventional confocal fluorescence microscope has problems that there is a limit to separation between a background signal having a spectrum component similar to that of a phosphor to be observed, such as autofluorescence, and desired fluorescence and that although the resolution is improved by a confocal optical system as compared to that of an ordinary microscope, the resolution is a limited one as compared to that of a super-resolution microscope. Although the resolution is increased by using a super-resolution microscope, complicated preparation associated with a complicated optical system is needed. There is a demand for a method capable of obtaining a higher resolution image or the like while having versatility equal to that of an ordinary confocal microscope. To increase the resolution in the focal direction in a confocal fluorescence microscope, it is required to narrow a pinhole or a slit provided at a position confocal with the light source; however, due to this, some light is blocked at the slit or the pinhole, and consequently detection efficiency is reduced.

Here, there is a confocal fluorescence microscope that acquires an image or the like of a sample by staining the sample with a plurality of phosphors, or the like; however, the confocal fluorescence microscope is not used for the purpose of detecting a specific target on the assumption that a plurality of phosphors bind to the specific target at the same ratio, and furthermore a configuration in which the focal positions of various kinds of excitation light are different is not used. In an aspect of the present disclosure, a point light source based on a composite phosphor that is composed of two or more kinds of fluorescent molecules with known allocations is formed. As the method, for example, a molecule in which fluorescent molecules are chemically bonded at a specific composition ratio is used. Examples of the method for bonding two kinds of fluorescent molecules include direct covalent bonding of elements, bonding at a predetermined ratio by ionic bonding, covalent bonding or ionic bonding to a molecule serving as a common backbone (for example, a programmable dye), sample staining using pieces of a fluorescent antibody that are supposed to bind to a piece of a specific antigen almost at a known ratio, etc.

Figure 1B:
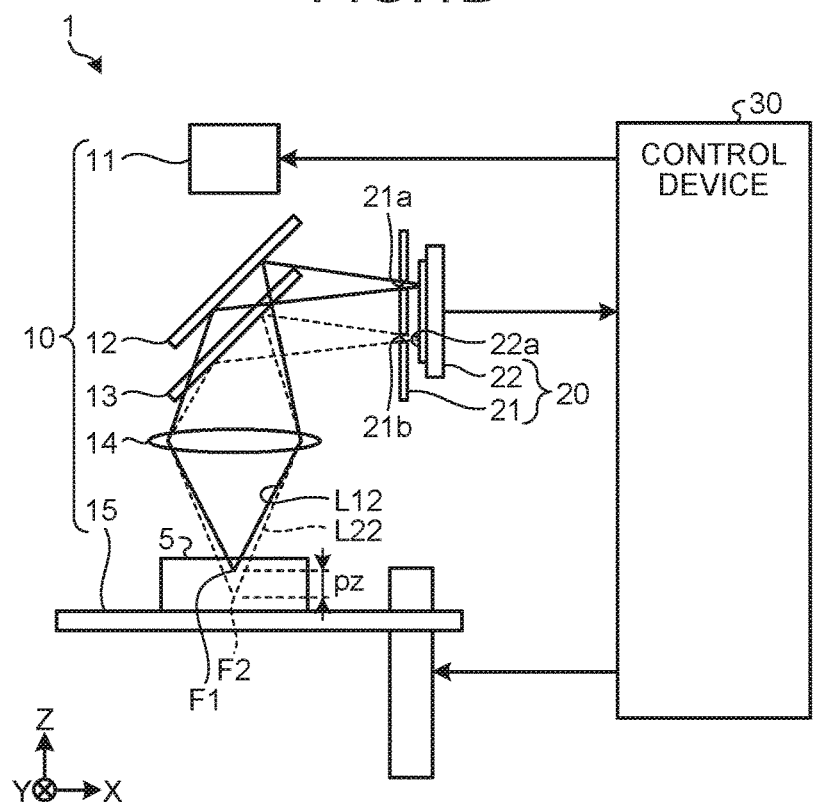
FIG. 1B is a diagram illustrating the example of the schematic configuration of the fluorescence observation apparatus according to the first embodiment.

2. First embodiment FIGS. 1A and 1B are diagrams illustrating an example of a schematic configuration of a fluorescence observation apparatus according to a first embodiment. In FIGS. 1A and 1B, a biological sample 5 is given as an example of an observation target of a fluorescence observation apparatus 1. First, the biological sample 5 is described.

The biological sample 5 is labeled (stained) with a composite phosphor. The composite phosphor contains two or more kinds of fluorescent molecules (phosphors) at a predetermined composition ratio. The composite phosphor may contain a plurality of fluorescent molecules of the same kind. Different kinds of fluorescent molecules have mutually different excitation fluorescence characteristics. The composite phosphor will now be further described with reference to FIG. 2.

FIG. 2 is a diagram illustrating an example of a composition of a composite phosphor. The composite phosphor contains at least two kinds of fluorescent molecules of fluorescent molecule A and fluorescent molecule B. Fluorescent molecule A has an excitation fluorescence characteristic of generating a first kind of fluorescence when irradiated with a first kind of excitation light. The first kind of excitation light includes light of a first wavelength $\lambda_1$. The first kind of fluorescence has a first spectrum. Fluorescent molecule B has an excitation fluorescence characteristic of generating a second kind of fluorescence when irradiated with a second kind of excitation light. The second kind of excitation light includes light of a second wavelength $\lambda_2$ (a wavelength different from the first wavelength $\lambda_1$). The second kind of fluorescence has a second spectrum (a spectrum different from the first spectrum). Fluorescent molecule A and fluorescent molecule B are molecularly bonded. Examples of the molecular bond include a covalent bond, an ionic bond, and the like. Fluorescent molecule A and fluorescent molecule B may be bonded to each other, or may be bonded to a backbone molecule (for example, a programmable dye). Alternatively, fluorescent molecules that bind to one piece of a specific antigen almost at a known ratio may be used as fluorescent molecule A and fluorescent molecule B. Fluorescent molecule A and fluorescent molecule B may be bonded at various composition ratios (for example, 1:1, 1:2, and the like). In the example illustrated in FIG. 3, the composition ratio between fluorescent molecule A and fluorescent molecule B is 1:2. Hereinafter, unless otherwise specified, a case where the composite phosphor contains two kinds of fluorescent molecules of fluorescent molecule A and fluorescent molecule B at a composition ratio of 1:2 is described.

Since the spacing between fluorescent molecule A and fluorescent molecule B molecularly bonded is very narrow, it can be assumed that the positions of fluorescent molecule A and fluorescent molecule B in the composite phosphor are almost the same. Therefore, the biological sample 5 labeled with the composite phosphor has excitation fluorescence characteristics of both fluorescent molecule A and fluorescent molecule B at the same position (point) in the biological sample 5.

Examples of fluorescent molecules like fluorescent molecule A and fluorescent molecule B include FITC (fluorescein isothiocyanate), Alexa Fluor (registered trademark)

dye, PE (phycoerythrin fluorescent protein), and the like. Next, a configuration of the fluorescence observation apparatus 1 is described.

As illustrated in FIGS. 1A and 1B, the fluorescence observation apparatus 1 includes an irradiation unit 10, a detection unit 20, and a control device 30. In the drawings, an XYZ coordinate system is given. For example, the Z-axis direction corresponds to the vertical direction, and the X-axis direction and the Y-axis direction correspond to the horizontal direction.

The irradiation unit 10 applies excitation light L11 and excitation light L21 to the biological sample 5. The irradiation unit 10 includes a light source 11, a mirror 12, a mirror 13, a lens 14, and a stage 15.

The light source 11 generates excitation light L11 and excitation light L21. The wavelength of excitation light L11 and the wavelength of excitation light L21 are a first wavelength $\lambda_1$ and a second wavelength $\lambda_2$ described above with reference to FIG. 2. The light source 11 includes, for example, a light bulb such as a mercury lamp, an LED (light emitting diode), a laser light source, or the like.

The mirror 12, the mirror 13, and the lens 14 are arranged on the optical axis between the light source 11 and the stage 15 so as to guide excitation light L11 and excitation light L21 to the biological sample 5 on the stage 15.

Each of the mirror 12 and the mirror 13 is an optical element (for example, a dichroic mirror) that transmits light of a specific wavelength and reflects light of another specific wavelength. Each of the mirror 12 and the mirror 13 transmits at least excitation light L11 and excitation light L21. The mirror 12 reflects fluorescence L12 described later so as to direct fluorescence L12 to the detection unit 20. The mirror 13 reflects fluorescence L22 described later so as to direct fluorescence L22 to the detection unit 20.

The lens 14 is an optical element (for example, an objective lens) that condenses excitation light L11 and excitation light L21 onto the biological sample 5. The light condensing position of excitation light L11 based on the lens 14 is referred to as light condensing position F1, and is illustrated. The light condensing position of excitation light L21 based on the lens 14 is referred to as light condensing position F2, and is illustrated. Light condensing position F1 and light condensing position F2 may be focal positions.

The biological sample 5 is mounted on the stage 15. In this example, the mounting surface extends in the XY plane direction. The biological sample 5 may have a length (area and thickness) in the X-axis direction, the Y-axis direction, and the Z-axis direction. An example of the length of the biological sample 5 is about several micrometers to several tens of micrometers. The biological sample 5 may, for example, be sandwiched between a not-illustrated slide glass and a not-illustrated cover glass, and be fixed on the stage 15. The stage 15 is configured to be movable in the X-axis direction, the Y-axis direction, and the Z-axis direction. The movement of the stage 15 is controlled by the control device 30, for example. As the biological sample 5 moves together with the stage 15, light condensing position F1 and light condensing position F2 in the biological sample 5 move in the scanning direction. Thus, the application of excitation light L11 and excitation light L21 to the biological sample 5 is scanned.

The mirror 12, the mirror 13, the lens 14, and the stage 15 are merely an example of an optical system for scanning and applying excitation light L11 and excitation light L21 to the biological sample 5. For example, it is also possible for scanning to be performed without using the stage 15 (without moving the biological sample 5). In addition, various optical systems capable of scanning and applying excitation light L11 and excitation light L21 to the biological sample 5 may be used.

Light condensing position F1 and light condensing position F2 will now be described. Light condensing position F1 and light condensing position F2 are positions shifted from each other (a plurality of spatially different positions). Light condensing position F1 and light condensing position F2 may be shifted from each other in the scanning direction of excitation light L11 and excitation light L21. In the example illustrated in FIGS. 1A and 1B, the scanning direction is the Z-axis direction; thus, light condensing position F1 and light condensing position F2 are shifted from each other in the Z-axis direction. The distance (the amount of shifting) between light condensing position F1 and light condensing position F2 in the Z-axis direction is referred to as offset distance pz, and is illustrated. The irradiation unit 10 simultaneously applies excitation light L11 and excitation light L21 to light condensing position F1 and light condensing position F2.

During scanning, when light condensing position F1 comes to a position of the composite phosphor and excitation light L11 is applied to the composite phosphor, fluorescence L12 is generated. When light condensing position F2 comes to a position of the composite phosphor and excitation light L21 is applied to the composite phosphor, fluorescence L22 is generated. Fluorescence L12 and fluorescence L22 are fluorescence having a first spectrum and fluorescence having a second spectrum described above with reference to FIG. 2. At least part of fluorescence L12 passes through the lens 14, is reflected at the mirror 12, and travels toward the detection unit 20. At least part of fluorescence L22 passes through the lens 14, is reflected at the mirror 13, and travels toward the detection unit 20.

The detection unit 20 detects excitation light L21 and fluorescence L22. The detection unit 20 includes a slit unit 21 and a photosensor 22.

The slit unit 21 has slits 21a and 21b. Slit 21a is provided at a position where fluorescence L12 is incident. Slit 21b is provided at a position where fluorescence L22 is incident.

The photosensor 22 receives fluorescence L12 and fluorescence L22 via the slit unit 21. More specifically, the photosensor 22 receives fluorescence L12 at a position corresponding to slit 21a and receives fluorescence L22 at a position corresponding to the photosensor 22b; thereby, receives fluorescence L12 and fluorescence L22 at different positions. The light receiving surface of the photosensor 22 is referred to as a light receiving surface 22a, and is illustrated. In this example, the light receiving surface 22a extends in the XZ plane direction. The light receiving surface 22a may include a plurality of pixels (photosensor pixels) provided in an array form, and thereby the amount (light reception level) of fluorescence incident (on each position of the light receiving surface 22a) is detected for each pixel. An example of the photosensor 22 is a CMOS (complementary metal oxide semiconductor) sensor.

A not-illustrated diffraction grating or the like is provided between the slit unit 21 and the light receiving surface 22a of the photosensor 22; each of fluorescence L12 and fluorescence L22 that has passed through the slit unit 21 (a one-dimensional image transmitted through the slit unit 21) is diffracted by the diffraction grating or the like at angles according to the wavelength and is then formed as an image on the light receiving surface 22a, and is thereby recorded as signal intensities at various wavelengths (a spectrum). By thus using a diffraction grating to acquire a spectral image of one-dimensional wavelengths and performing scanning of this process, a spectrum image of the sample surface is acquired. The detection result of the photosensor 22 (including the spectra of fluorescence L12 and fluorescence L22) is sent to the control device 30.

The slit unit 21 and the photosensor 22 are merely an example of a configuration for (separating and) detecting fluorescence L12 and fluorescence L22. For example, the amount of light may be detected by providing a pinhole at a focal position of each kind of light, alternatively providing a filter (a filter that selectively transmits only the corresponding kind of fluorescence, or the like) on the optical path, or the like. In the case where a pinhole is provided instead of the slit unit 21, a point image is acquired instead of the one-dimensional image described above. It is also possible to employ a method in which an optical element having a spectral function is added and the inner product with a pre-measured spectral spectrum or the like is taken, and thereby only the corresponding kind of fluorescence is detected. Various configurations may be used in addition to these.

The control device 30 controls the irradiation unit 10, and processes a detection result of the detection unit 20. The control device 30 will now be further described with reference to FIG. 3.

FIG. 3 is a diagram illustrating an example of functional blocks of the control device 30. The control device 30 includes an irradiation control unit 31, a storage unit 32, a calculation unit 33, and a display unit 34.

As described above with reference to FIGS. 1A and 1B, the irradiation control unit 31 controls the irradiation unit 10 such that excitation light L11 and excitation light L21 are simultaneously applied to light condensing position F1 and light condensing position F2.

The storage unit 32 stores various pieces of information necessary for the processing of the control device 30. For example, the storage unit 32 stores composite phosphor information like that described above with reference to FIG. 2 (the kind of the fluorescent molecule, excitation fluorescence characteristics, the composition ratio, etc.). The composite phosphor information includes also a spectrum (predetermined spectrum) of fluorescence emitted by the fluorescent molecule. In addition, every possible piece of information necessary for the calculation of the calculation unit 33 described later may be stored in the storage unit 32. The storage unit 32 stores also a program 32a. The program 32a is software that implements control (processing) to be executed by the control device 30, and is used for, for example, processing using a detection result of the detection unit 20. The program 32a may be provided via a network, or may be provided via an arbitrary storage medium. The program 32a may be updated as appropriate. In addition, various pieces of information necessary for processing to be executed by the control device 30 may be stored in the storage unit 32.

The calculation unit 33 performs various pieces of processing using a detection result of the detection unit 20. Functional blocks corresponding to some typical pieces of processing are illustrated in FIG. 3. In this example, the calculation unit 33 includes a fluorescence intensity calculation unit 33a, an offset correction unit 33b, a synthesized fluorescence signal generation unit 33c, an image generation unit 33d, and a number-of-fluorescent-molecules calculation unit 33e.

The fluorescence intensity calculation unit 33a calculates the fluorescence intensities of fluorescence L12 and fluorescence L22. The fluorescence intensity is a fluorescence intensity corresponding to a position in the biological sample 5, and is more specifically a fluorescence intensity corresponding to a scanning position in the biological sample 5. An example of the calculation of the fluorescence intensity of fluorescence L12 will now be described; the fluorescence intensity calculation unit 33a takes the inner product of a spectrum of fluorescence L12 detected by the detection unit 20 and a corresponding predetermined spectrum (stored in the storage unit 32). Since the inner product becomes larger as both spectra become more similar, the fluorescence intensity of fluorescence L12 having the predetermined spectrum is calculated by taking the inner product. Also the fluorescence intensity of fluorescence L22 is similarly calculated. Hereinafter, a signal showing the fluorescence intensity of fluorescence L12 corresponding to a position (more specifically, a scanning position) in the biological sample 5 is referred to as fluorescence signal S1. A signal showing the fluorescence intensity of fluorescence L22 corresponding to a position in the biological sample 5 is referred to as fluorescence signal S2.

Figure 4:
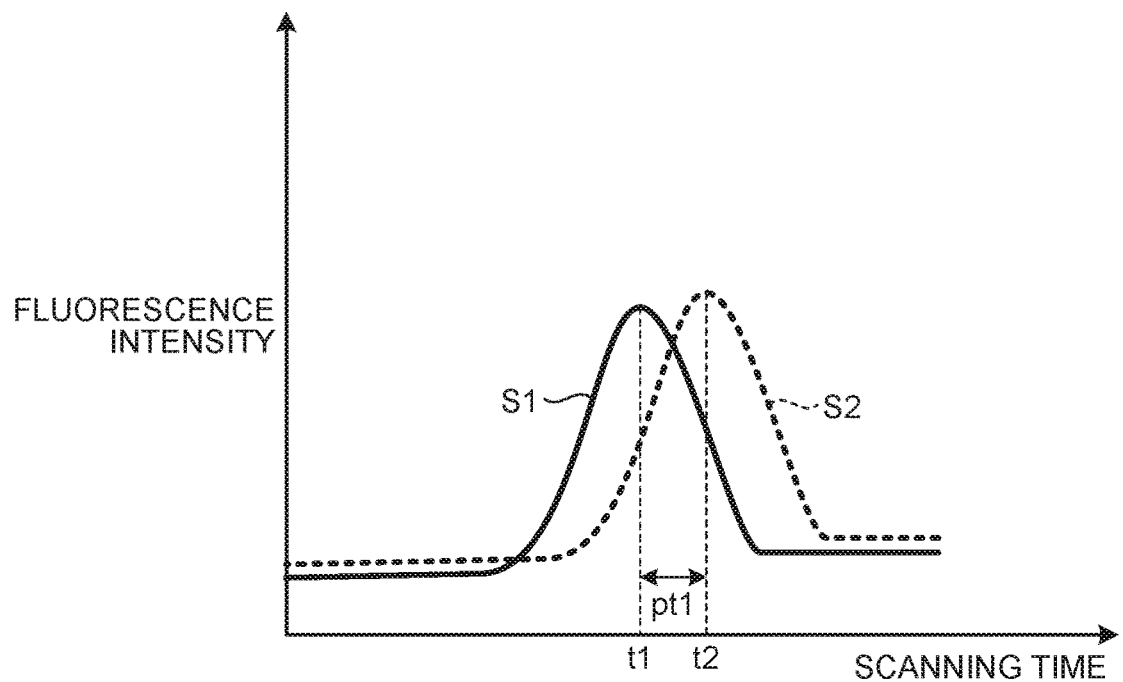
FIG. 4 is a diagram conceptually illustrating an example of fluorescence signals.

FIG. 4 is a diagram conceptually illustrating an example of fluorescence signals. The horizontal axis of the graph represents the scanning time, and the vertical axis represents the fluorescence intensity. The solid graph line S1 indicates the intensity of fluorescence signal S1 of fluorescence L12. The broken graph line S2 indicates the intensity of fluorescence signal S2 of fluorescence L22. The scanning time at which fluorescence signal S1 shows a peak is referred to as scanning time t1, and is illustrated. The scanning time at which fluorescence signal S2 shows a peak is referred to as scanning time t2, and is illustrated. The time from scanning time t1 to scanning time t2 is referred to as offset time pt1, and is illustrated. Offset time pt1 is the time required for scanning of offset distance pz (see FIGS. 1A and 1B).

Returning to FIG. 3, the offset correction unit 33b corrects the offset (offset distance pz and offset time pt1). For example, assuming that fluorescence signal S1 and fluorescence signal S2 are functions S1($t$) and S2($t$) of time t, the offset correction unit 33b performs correction to S1($t$)=S1 (t−pt1) or correction to S2 ($t$)=S2 (t+pt1). These corrections correspond to, in FIG. 4, the shifting of fluorescence signal S1 or fluorescence signal S2 to the right side or the left side by offset time pt1.

Figure 5:
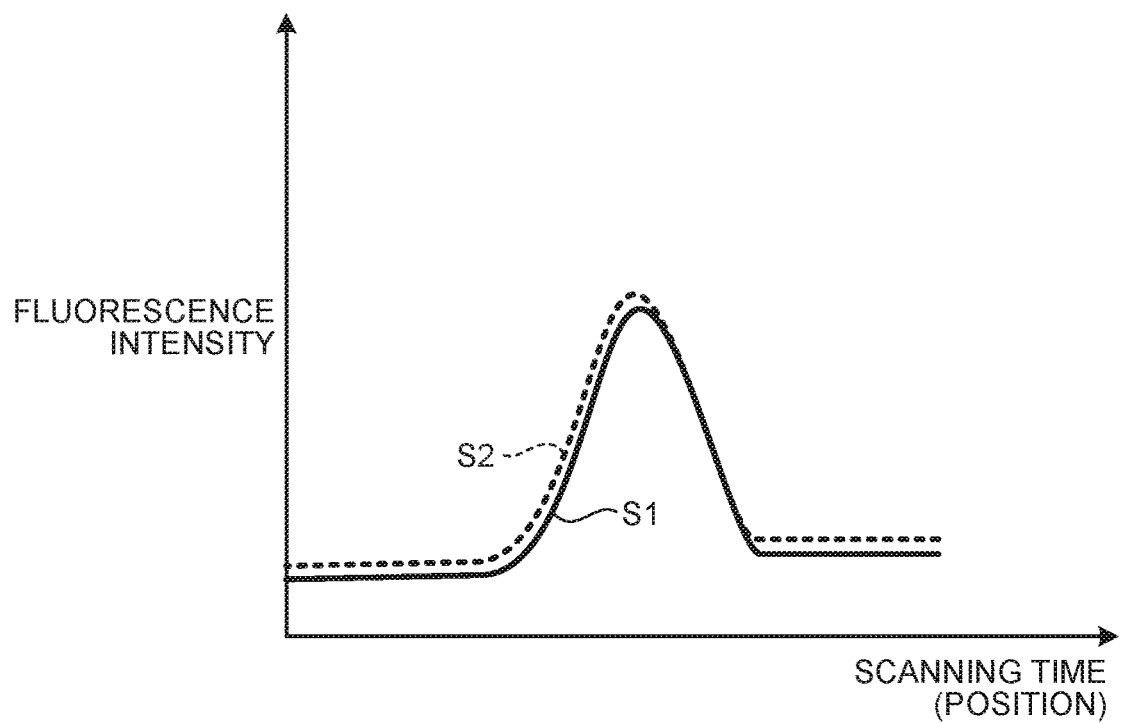
FIG. 5 is a diagram conceptually illustrating an example of fluorescence signals after offset correction.

FIG. 5 is a diagram conceptually illustrating an example of fluorescence signals after offset correction. The horizontal axis of the graph represents the scanning time, and also represents the position in the biological sample 5. By the offset correction, the peak of fluorescence signal S1 and the peak of fluorescence signal S2 almost coincide.

Returning to FIG. 3, the synthesized fluorescence signal generation unit 33c generates a synthesized fluorescence signal from fluorescence signal S1 and fluorescence signal S2 after offset correction. For example, the synthesized fluorescence signal generation unit 33c generates a synthesized fluorescence signal S by multiplying together fluorescence signal S1 and fluorescence signal S2. In this case, fluorescence signal S1 and fluorescence signal S2 may be multiplied together with a ratio corresponding to the predetermined composition ratio. For example, each of fluorescence signal S1 and fluorescence signal S2 may be raised to the power of a ratio corresponding to the predetermined composition ratio, and then be multiplied. Herein, the composition ratio between fluorescent molecule A that generates fluorescence signal S1 and fluorescent molecule B that generates fluorescence signal S2 is 1:2; thus, the synthesized fluorescence signal S may be calculated as $S=S1\times(S2)^2$. By performing multiplication with a ratio corresponding to the predetermined composition ratio, it becomes possible to, for example, identify a specific target with better accuracy while suppressing the influence of autofluorescence or the like. The result of multiplication of fluorescence signal S1 and fluorescence signal S2 may be further made into a power root by using a number corresponding to the number of multiplications. That is, the synthesized fluorescence signal S may be calculated as $S=(S1\times(S2)^2)^{1/3}$. By taking a power root, the fluorescence intensity of the synthesized fluorescence signal S indicates the fluorescence intensities of the original fluorescence signal S1 and the original fluorescence signal S2, that is, the fluorescence intensity detected for each pixel of the light receiving surface 22a of the photosensor 22.

Figure 6:
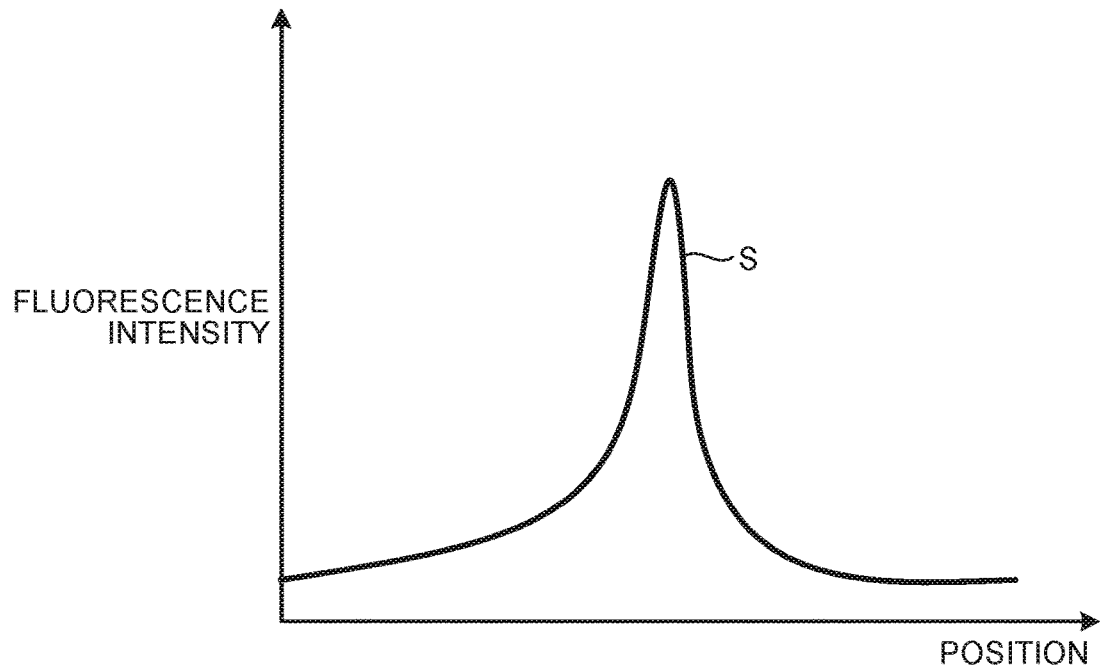
FIG. 6 is a diagram conceptually illustrating an example of a synthesized fluorescence signal.

FIG. 6 is a diagram conceptually illustrating an example of a synthesized fluorescence signal. The position of the peak of the synthesized fluorescence signal S corresponds to a position (estimated position) of the composite phosphor. Since the synthesized fluorescence signal S is calculated on the basis of fluorescence signal S1 and fluorescence signal S2, the synthesized fluorescence signal S shows, similarly to fluorescence signal S1 and fluorescence signal S2, a fluorescence intensity corresponding to a position (more specifically, a scanning position) in the biological sample 5. In the case of one-dimensional scanning, the position is represented by any one of the position on the X-axis, the position on the Y-axis, and the position on the Z-axis. In the case of two-dimensional scanning, the position is represented by two positions among the position on the X-axis, the position on the Y-axis, and the position on the Z-axis. In the case of three-dimensional scanning, the position is represented by the three positions of the position on the X-axis, the position on the Y-axis, and the position on the Z-axis. By calculating such a synthesized fluorescence signal S, the synthesized fluorescence signal generation unit 33c determines the distribution of pieces of the composite phosphor that labels the biological sample 5.

Here, the synthesized fluorescence signal S (FIG. 6) has a narrower peak width (for example, a half-value width) than each of fluorescence signal S1 and fluorescence signal S2 (FIG. 5). The reason is as follows: each of excitation light L11 and excitation light L21 has an image spread (FIG. 1A). Also each of fluorescence L12 and fluorescence L22 has an image spread (FIG. 1B). For fluorescence signal S1 obtained by using two pieces of light of excitation light L11 and fluorescence L12, the image spread is shrunk to, for example, $1/\sqrt{2}$ of a fluorescence signal obtained by simply observing fluorescence L12 without applying excitation light L11. The same applies to fluorescence signal S2. The synthesized fluorescence signal S obtained by multiplying together fluorescence signal S1 and fluorescence signal S2 exhibits a sharper peak because the image spread is shrunk to $1/2$ ($=1/\sqrt{2}\times1/\sqrt{2}$).

Determining the distribution of pieces of the composite phosphor from a synthesized fluorescence signal S with a narrower peak width means an improvement in the resolution of fluorescence detection. Furthermore, in the synthesized fluorescence signal S, noise components of fluorescence signal S1 and fluorescence signal S2 are canceled by multiplication, and therefore also the influence of the noise level or the like is reduced.

As described above, light condensing position F1 and light condensing position F2 (FIGS. 1A and 1B) may be focal positions. In this case, it can also be said that the irradiation unit 10 and the detection unit 20 constitute a confocal microscope that condenses excitation light L11 and excitation light L21 to different focal positions and detects fluorescence L12 and fluorescence L22 generated. Each of the composite phosphor present at light condensing position F1 and the composite phosphor present at light condensing position F2 predominantly generates fluorescence L12 or fluorescence L22 only when condensation of excitation light L11 or excitation light L21 reaches the composite phosphor itself, and therefore mixing of signals from other phosphors can be suppressed. The spatial separation ability of each piece of fluorescence can be further enhanced by, in addition to separating fluorescence L12 and fluorescence L22 by using a difference between light condensing position F1 and light condensing position F2, employing a configuration in which the detection positions (confocal positions) of fluorescence L12 and fluorescence L22 in the detection unit 20 are different.

Returning to FIG. 3, the image generation unit 33d generates a fluorescence image of the biological sample 5 from a synthesized fluorescence signal S. The fluorescence image may be an image showing a fluorescence intensity of the composite phosphor for each position in the biological sample 5. The form of the image is not particularly limited, and images of various forms may be used. The image may be a two-dimensional image, or may be a three-dimensional image. In the fluorescence image, an S/N value or the like may be shown as a result of segmentation.

The number-of-fluorescent-molecules calculation unit 33e calculates the number of fluorescent molecules from a synthesized fluorescence signal S. For example, it is calculated as follows. First, the number-of-fluorescent-molecules calculation unit 33e acquires luminance for each position in the biological sample 5. As the luminance, a fluorescence luminance shown in a synthesized fluorescence signal S generated by the synthesized fluorescence signal generation unit 33c (a fluorescence intensity for each position in the biological sample 5) is acquired.

Next, the number-of-fluorescent-molecules calculation unit 33e calculates the number of electrons. The number of electrons is obtained by multiplying the luminance by the amount of saturation charge of the photosensor element and dividing the result by the light reception period (exposure time).

Next, the number-of-fluorescent-molecules calculation unit 33e calculates the number of photons. The number of photons is obtained by dividing the number of electrons by the quantum absorption rate of the photosensor element (a CMOS or the like). The number of photons calculated here is the number of photons based on fluorescence detected through the lens 14 (for example, an objective lens) among the rays of fluorescence emitted in all directions.

Next, the number-of-fluorescent-molecules calculation unit 33e calculates the number of photons converted on an all-direction basis. The number of photons converted on an all-direction basis is obtained by a method in which the above-mentioned number of photons calculated on the basis of fluorescence detected through the lens 14 is divided by the ratio of the range detectable through the lens 14 to the range in all directions.

Next, the number-of-fluorescent-molecules calculation unit 33e calculates the number of fluorescent molecules. The number of fluorescent molecules is obtained by dividing the number of photons converted on an all-direction basis by the number of emitted photons per molecule. The number of emitted photons per molecule is a value obtained by multiplying the number of absorbed photons (Abs Photon) by the quantum yield of the fluorescent substance.

The number of absorbed photons is a value obtained by multiplying the excitation photon density by the absorption cross-sectional area. The excitation photon density is a value obtained by dividing the excitation power density by the energy of one photon.

The energy of one photon is obtained as $h \times c/\lambda \approx 3.66 \times 10^{-18}$ (J) by using the Planck constant h ($=6.62607 \times 10^{-34}$ (Js)), the speed of light c in vacuum ($=2.99792458 \times 10^8$ (m/s)), and the wavelength $\lambda$ of the electromagnetic wave in vacuum.

The absorption cross-sectional area indicates the ease of absorption per molecule. The absorption cross-sectional area is obtained as 1960000 (L/mol/cm)×1000 (cm$^3$)×2.3/6.02× 10$^{23}$ (pieces)=7.49×10$^{-15}$ (cm$^2$/molecule) by using the molar absorption coefficient $\varepsilon$=196000 (L/mol/cm)). The multiplication by 1000 (cm$^3$) is for the purpose of conversion of (L) to (cm$^3$) in agreement with the unit of excitation photon density. The division by 6.02×10$^{23}$ (pieces) is for the purpose of conversion to a value per fluorescent molecule. The multiplication by 2.3 is for the purpose of conversion of the absorbance from Log to Ln.

The number-of-fluorescent-molecules calculation unit 33e calculates the number of fluorescent molecules for each position in the biological sample 5 in the above manner, for example. Further, the number-of-fluorescent-molecules calculation unit 33e may calculate the number of pieces of an antibody by dividing the number of fluorescent molecules by the fluorescence labeling rate. The fluorescence labeling rate is also called an F/P value (Fluorescein/Protein) or the like, and indicates the number of fluorescent molecules that label the antibody.

The image generation unit 33d may generate an image that reflects the number of fluorescent molecules calculated by the number-of-fluorescent-molecules calculation unit 33e or the number of pieces of an antibody bonded to fluorescent molecules. In this case, the image generation unit 33d may generate an image in which the luminance at each position in the biological sample 5 increases as the number of fluorescent molecules increases.

The display unit 34 displays a calculation result of the calculation unit 33. The displaying may be performed in various forms such as a graph, a numerical value, or an image, or a combination of these.

The control device 30 described above may be configured by, for example, a general-purpose computer or the like (a PC, a tablet terminal, or the like) capable of executing the program 32a (software) described above. The control device 30 may be provided separately from the fluorescence observation apparatus 1. In this case, a fluorescence observation system including: a fluorescence observation apparatus including an irradiation unit 10 and a detection unit 20; and software is provided. Also such a fluorescence observation system is an aspect of the present disclosure. An example of a hardware configuration of the control device 30 will be described later with reference to FIG. 13.

Figure 7:
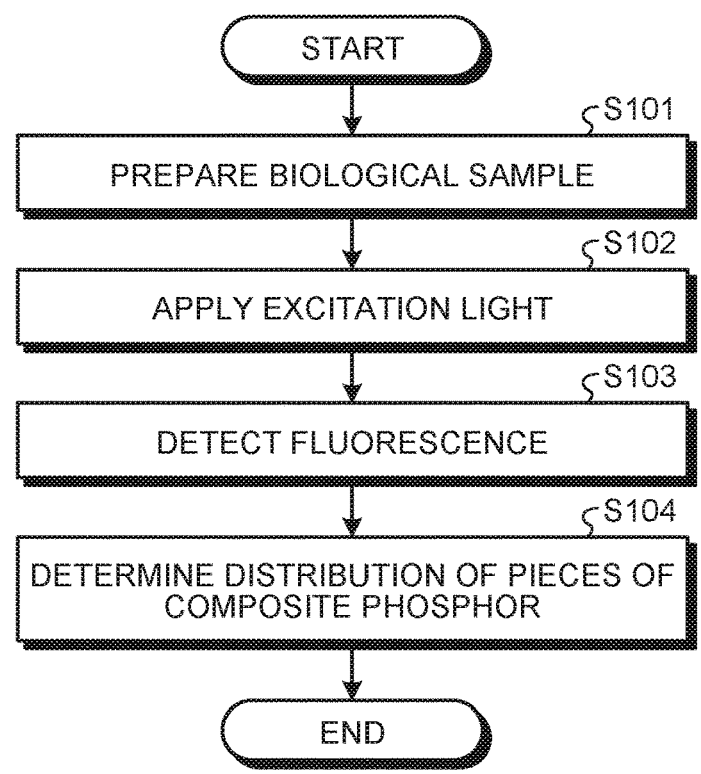
FIG. 7 is a flowchart illustrating an example of a fluorescence observation method performed by using a fluorescence observation apparatus.

FIG. 7 is a flowchart illustrating an example of a fluorescence observation method performed by using a fluorescence observation apparatus.

In step S101, a biological sample is prepared. That is, the biological sample 5 is labeled with a composite phosphor, and is mounted on the stage 15. This processing may be performed by, for example, the user of the fluorescence observation apparatus 1, or the like.

In step S102, excitation light is applied. Specifically, the control device 30 controls the irradiation unit 10 to simultaneously apply excitation light L11 and excitation light L21 to light condensing position F1 and light condensing position F2 on the biological sample 5.

In step S103, fluorescence is detected. Specifically, the detection unit 20 detects fluorescence L12 and fluorescence L22 generated in response to the application of excitation light in step S102 described above.

In step S104, the distribution of pieces of the composite phosphor is determined. Specifically, the fluorescence intensity calculation unit 33a of the calculation unit 33 calculates the fluorescence intensities of fluorescence L12 and fluorescence L22 detected in step S103 described above, and obtains fluorescence signal S1 and fluorescence signal S2. The offset correction unit 33b corrects the offset of fluorescence signal S1 and fluorescence signal S2. The synthesized fluorescence signal generation unit 33c synthesizes fluorescence signal S1 and fluorescence signal S2 after offset correction to generate a synthesized fluorescence signal S, and determines the distribution of pieces of the composite phosphor. In addition, for example, the generation of a fluorescence image by the image generation unit 33d, the calculation of the number of fluorescent molecules by the number-of-fluorescent-molecules calculation unit 33e, etc. may be performed. The display unit 34 may display various calculation results including a result of determination of the distribution of pieces of the composite phosphor in various forms.

After the processing of step S104 is completed, the processing of the flowchart ends.

The above embodiment describes an example in which excitation light L11 and excitation light L21 are scanned in the Z-axis direction. As a matter of course, excitation light L11 and excitation light L21 may be scanned in the X-axis direction and the Y-axis direction. Further, irradiation units and detection units of various configurations may be used in addition to the irradiation unit 10 and the detection unit 20 described with reference to FIGS. 1A and 1B. Some examples will now be described with reference to FIGS. 8A, 8B, 9A, and 9B. In the following, examples of scanning in the X-axis direction are described.

Figure 8A:
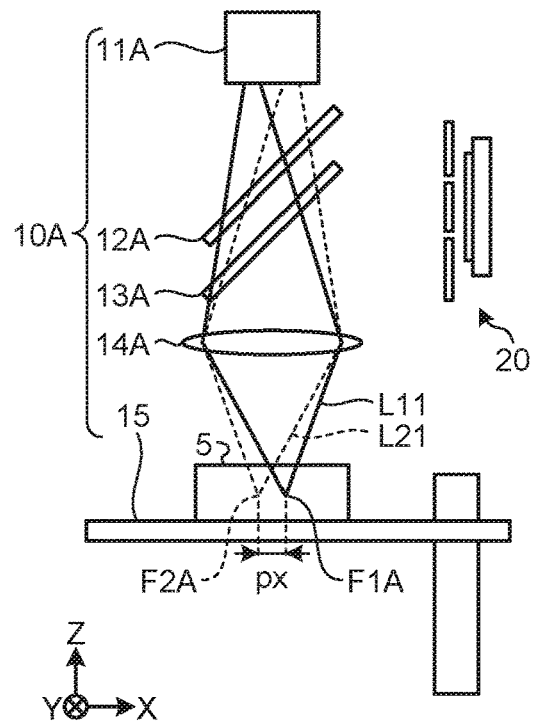
FIG. 8A is a diagram illustrating another example of a schematic configuration of an irradiation unit.
Figure 8B:
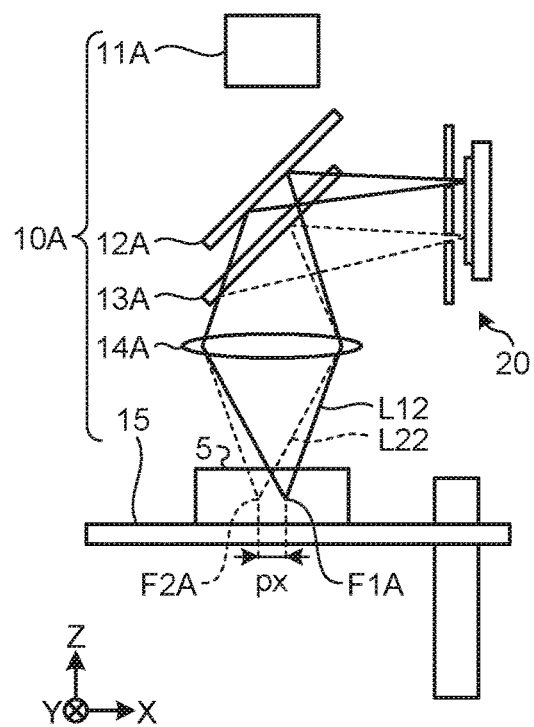
FIG. 8B is a diagram illustrating the other example of the schematic configuration of the irradiation unit.

FIGS. 8A and 8B are diagrams illustrating another example of a schematic configuration of an irradiation unit. An irradiation unit 10A illustrated in FIGS. 8A and 8B include a light source 11A, a mirror 12A, a mirror 13A, a lens 14A, and a stage 15. The light source 11A, the mirror 12A, the mirror 13A, and the lens 14A are configured to apply excitation light L11 and excitation light L21 to light condensing position F1A and light condensing position F2A. Light condensing position F1A and light condensing position F2A are shifted from each other in the X-axis direction. The distance between light condensing position F1A and light condensing position F2A in the X-axis direction is referred to as offset distance px, and is illustrated. Fluorescence L12 is generated at light condensing position F1A by the application of excitation light L11, and fluorescence L22 is generated at light condensing position F2A by the application of excitation light L21. Fluorescence L12 and fluorescence L22 are detected by the detection unit 20. The detection result of the detection unit 20 is processed by the calculation unit 33 of the control device 30. The processing by the calculation unit 33 is as described above except that offset distance px is used instead of offset distance pz (FIGS. 1A and 1B), and a description is not repeated.

Figure 9A:
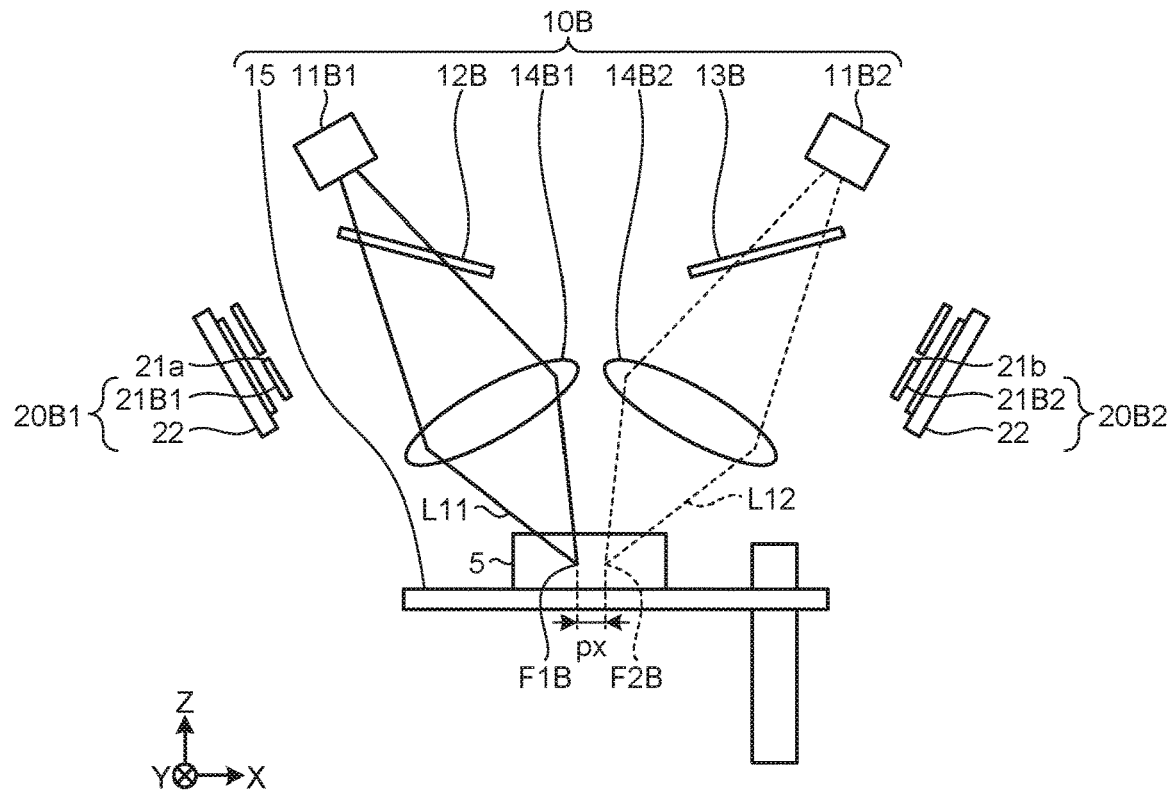
FIG. 9A is a diagram illustrating another example of a schematic configuration of an irradiation unit and a detection unit.
Figure 9B:
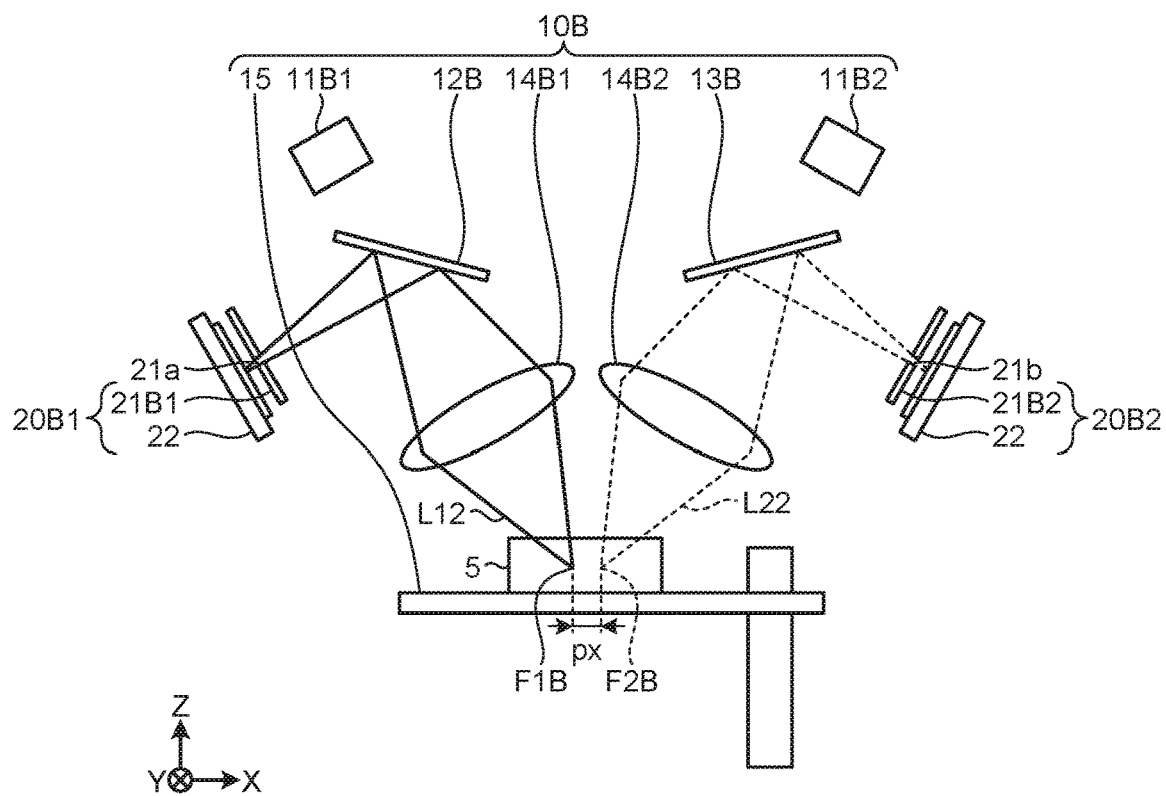
FIG. 9B is a diagram illustrating the other example of the schematic configuration of the irradiation unit and the detection unit.

FIGS. 9A and 9B are diagrams illustrating another example of a schematic configuration of an irradiation unit and a detection unit. An irradiation unit 10B illustrated in FIGS. 9A and 9B include a light source 11B1, a light source 11B2, a mirror 12B, a mirror 13B, a lens 14B1, a lens 14B2, and a stage 15. The light source 11B1, the mirror 12B, and the lens 14B1 are configured to apply excitation light L11 to light condensing position F1B. The light source 11B2, the mirror 13B, and the lens 14B2 are configured to apply excitation light L21 to light condensing position F2B. Light condensing position F1B and light condensing position F2B are shifted by offset distance px in the X-axis direction. By the lens 14B1 and the lens 14B2 being provided for light condensing position F1B and light condensing position F2B, respectively, excitation light L11 and excitation light L21 are applied to light condensing position F1B and light condensing position F2B with different optical axes.

Fluorescence L12 is generated at light condensing position F1B by the application of excitation light L11, and fluorescence L22 is generated at light condensing position F2B by the application of excitation light L21. Fluorescence L12 is detected by the detection unit 20B1, and fluorescence L22 is detected by the detection unit 20B2. The detection unit 20B1 includes a slit unit 21B1 and a photosensor 22. The photosensor 22 of the detection unit 20B1 receives (detects) fluorescence L12 via a slit 21a of the slit unit 21B1. The detection unit 20B2 includes a slit unit 21B2 and a photosensor 22. The photosensor 22 of the detection unit 20B2 receives fluorescence L22 via a slit 21b of the slit unit 21B2. The detection results of the detection unit 20B1 and the detection unit 20B2 are processed by the calculation unit 33 of the control device 30. The processing by the calculation unit 33 is as described above except that offset distance px is used instead of offset distance pz (FIGS. 1A and 1B), and a description is not repeated.

3. Second Embodiment

The first embodiment described above describes an example in which excitation light L11 and excitation light L21 are simultaneously applied to light condensing position F1 and light condensing position F2 that are spatially different. In a second embodiment described next, excitation light L11 and excitation light L21 are applied to a plurality of temporally different positions (a plurality of spatially identical positions) in a time division manner.

Figure 10A:
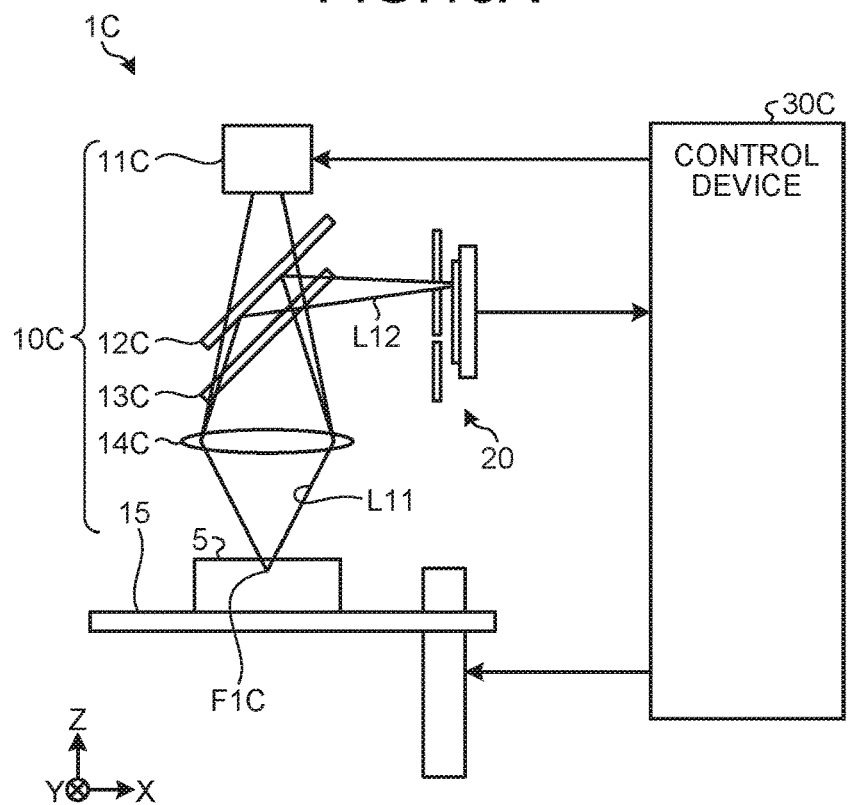
FIG. 10A is a diagram illustrating an example of a schematic configuration of a fluorescence observation apparatus according to a second embodiment.
Figure 10B:
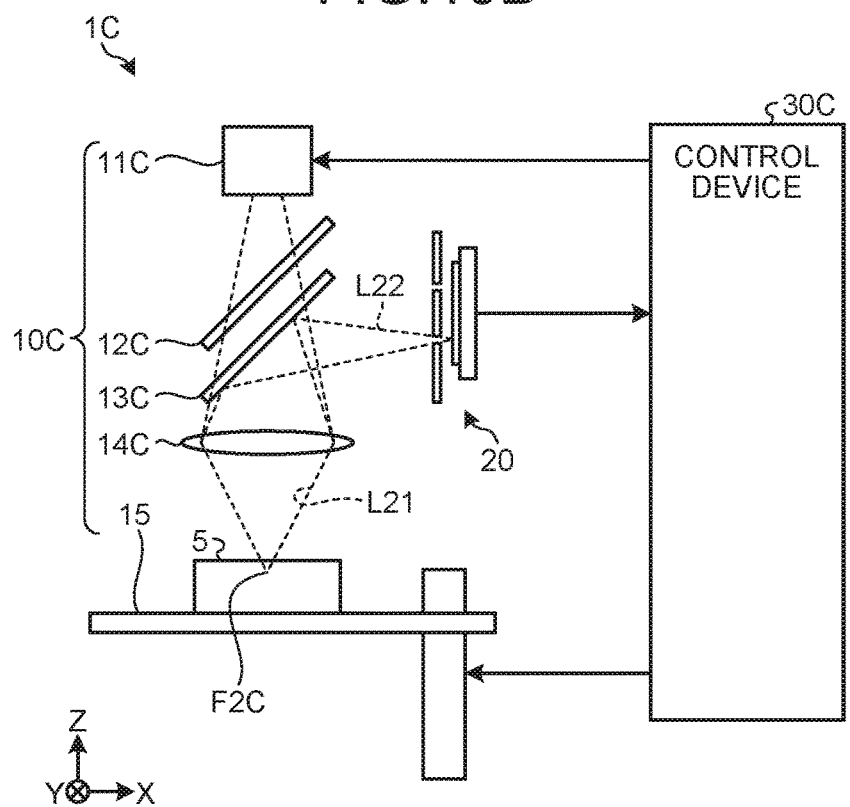
FIG. 10B is a diagram illustrating the example of the schematic configuration of the fluorescence observation apparatus according to the second embodiment.

FIGS. 10A and 10B are diagrams illustrating an example of a schematic configuration of a fluorescence observation apparatus according to a second embodiment. A fluorescence observation apparatus 1C illustrated in FIGS. 10A and 10B differ from the fluorescence observation apparatus 1 (FIGS. 1A and 1B) in that an irradiation unit 10C and a control device 30C are provided in place of the irradiation unit 10 and the control device 30.

The irradiation unit 100 includes a light source 11C, a mirror 12C, a mirror 13C, a lens 14C, and a stage 15. The light source 11C, the mirror 12C, the mirror 13C, and the lens 14C are configured to apply excitation light L11 and excitation light L21 to light condensing position F1C and light condensing position F2C in a time division manner. Light condensing position F1C and light condensing position F2C are spatially identical positions. Light condensing position F1C and light condensing position F2C are temporally different positions. That is, the time at which excitation light L11 is applied to light condensing position F1C and the time at which excitation light L21 is applied to light condensing position F2C are different.

The application of excitation light L11 and excitation light L21 is performed by controlling the timings of the emission of excitation light L11 and the emission of excitation light L21 by the light source 11C. This control may be performed by the control device 30C. For example, the emission of excitation light L11 and excitation light L21 is controlled such that the application of excitation light L11 to light condensing position F1C and the application of excitation light L21 to light condensing position F2C are alternately and periodically performed in a time series. It can also be said that excitation light modulated to alternately include excitation light L11 and excitation light L21 in a time series is emitted from the light source 11C.

The period of each of the applications of excitation light L11 and excitation light L21 to light condensing position F1C and light condensing position F2C may be set to, for example, a much shorter period than a period required to scan the entire search range (a scanning period). In this case, since excitation light L11 and excitation light L21 are continuously applied to almost the same scanning position, excitation light L11 and excitation light L21 are applied to all the scanning positions in a time division manner in the scanning period.

The same scanning range may be scanned twice; in this case, the period of the application of each of excitation light L11 and excitation light L21 may be set equal to the scanning period. Excitation light L11 and excitation light L21 are applied to all the scanning positions in a time division manner in a period twice the scanning period. Since it is not necessary to switch excitation light L11 and excitation light L21 during one scanning period, each scanning period may be set shorter.

Fluorescence L12 and fluorescence L22 are detected by the detection unit 20. The detection result of the detection unit 20 is processed by the control device 30C. The control device 30C will now be further described with reference to FIG. 11.

Figure 11:
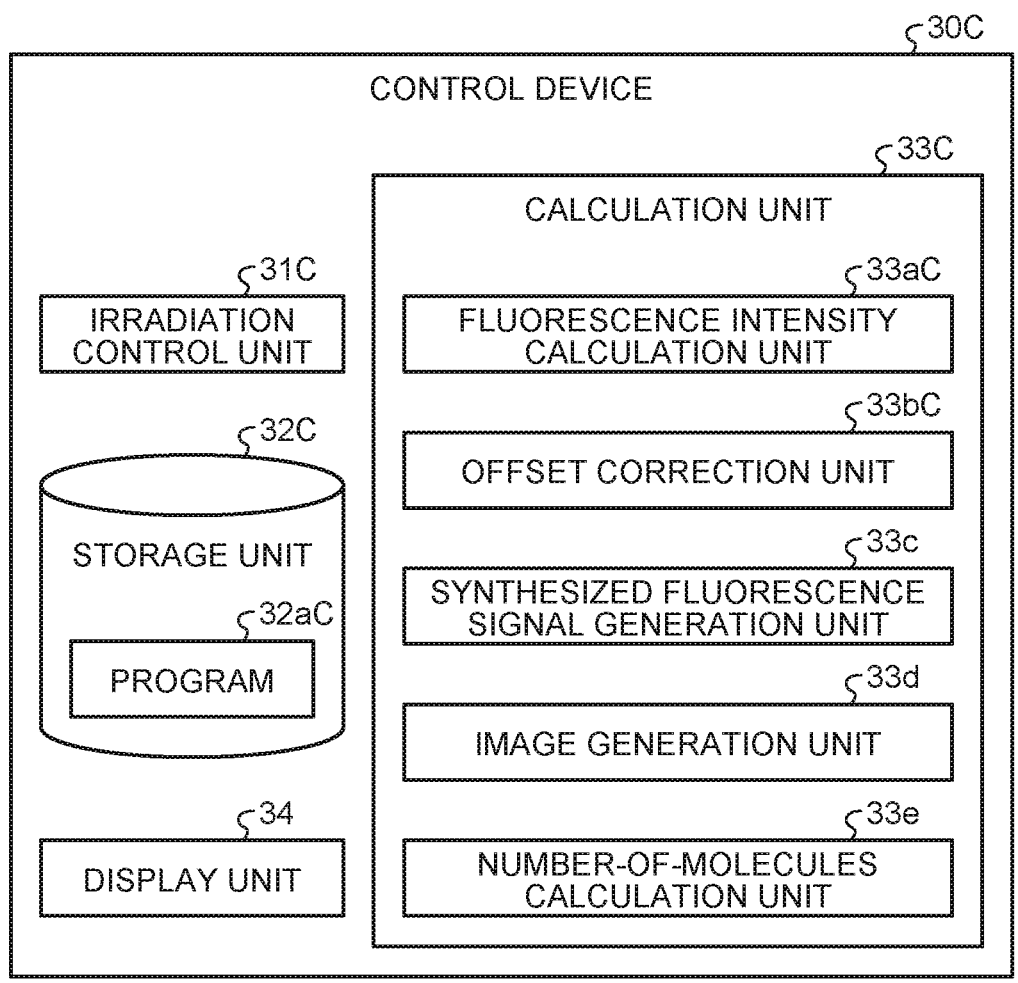
FIG. 11 is a diagram illustrating an example of functional blocks of a control device.

FIG. 11 is a diagram illustrating an example of functional blocks of the control device 30C. The control device 30C differs from the control device 30 (FIG. 3) in that an irradiation control unit 31C, a storage unit 32C, and a calculation unit 33C are provided in place of the irradiation control unit 31, the storage unit 32, and the calculation unit 33.

As described above with reference to FIGS. 10A and 10B, the irradiation control unit 31C controls the irradiation unit 10C such that excitation light L11 and excitation light L21 are applied to light condensing position F1C and light condensing position F2C in a time division manner.

The storage unit 32C stores a program 32aC. The program 32aC is software that implements control (processing) to be executed by the control device 30C.

The calculation unit 33C differs from the calculation unit 33 (FIG. 3) in that an offset correction unit 33bC is provided in place of the offset correction unit 33b.

In the fluorescence observation apparatus 1C, the offset correction unit 33bC may or may not perform offset correction. Specifically, in the case where the period of the application of each of excitation light L11 and excitation light L21 is much shorter than the scanning period and fluorescence signal S1 and fluorescence signal S2 are obtained by one scan, the offset correction unit 33bC does not perform offset correction. This is because in this case, as described above with reference to FIG. 5, fluorescence signal S1 and fluorescence signal S2 of which the peak positions coincide are obtained from the beginning. On the other hand, in the case where the period of the application of each of excitation light L11 and excitation light L21 is equal to the scanning period and fluorescence signal S1 and fluorescence signal S2 are obtained by two scans, the offset correction unit 33bC performs offset correction. This will now be described with reference to FIG. 12.

Figure 12:
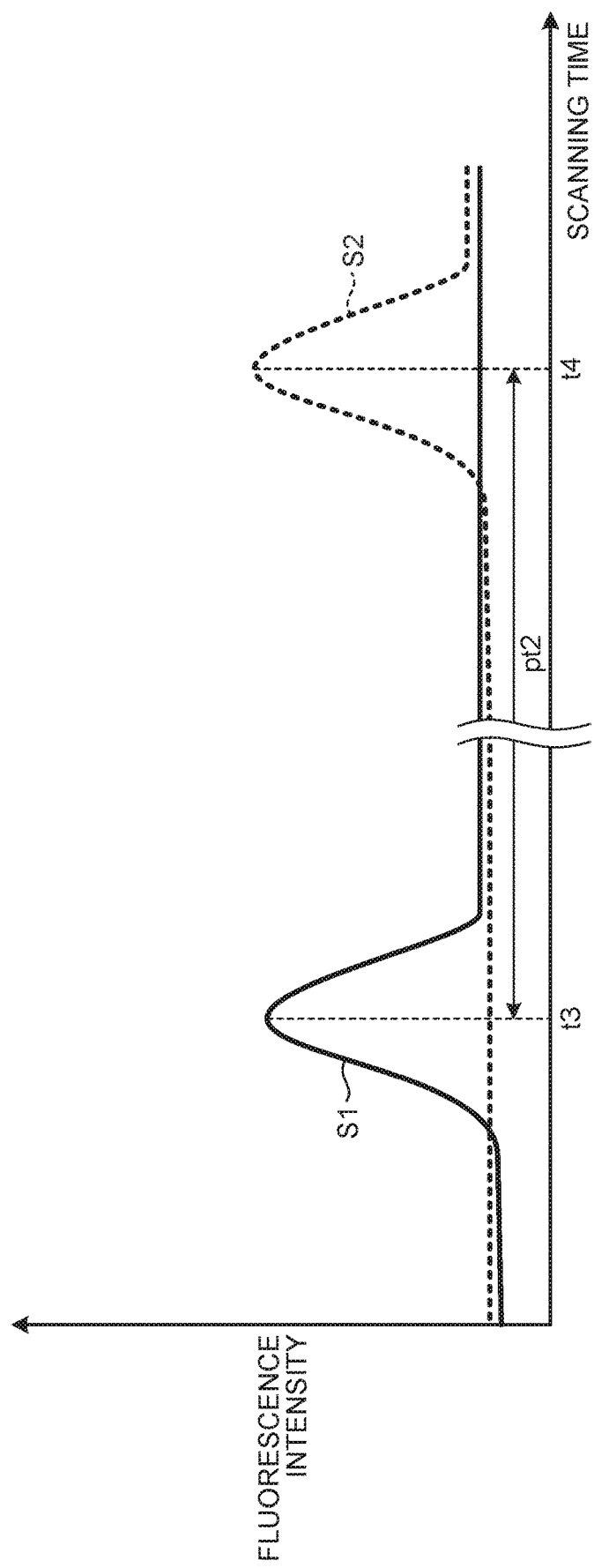
FIG. 12 is a diagram conceptually illustrating an example of fluorescence signals.

FIG. 12 is a diagram conceptually illustrating an example of fluorescence signals. The scanning time at which fluorescence signal S1 shows a peak is referred to as scanning time t3, and is illustrated. The scanning time at which fluorescence signal S2 shows a peak is referred to as scanning time t4, and is illustrated. The time from scanning time t3 to scanning time t4 is referred to as offset time pt2, and is illustrated. Offset time pt2 corresponds to the scanning period. Assuming that, for example, fluorescence signal S1 and fluorescence signal S2 are functions of time, the correction of offset time pt2 is made by correction to $S1(t)=S1(t-pt2)$ or correction to $S2(t)=S2(t+pt2)$. These corrections correspond to, in FIG. 12, the shifting of fluorescence signal S1 or fluorescence signal S2 to the right side or the left side by offset time pt2.

The synthesized fluorescence signal generation unit 33c, the image generation unit 33d, the number-of-fluorescent-molecules calculation unit 33e, etc. that perform processing on fluorescence signal S1 and fluorescence signal S2 after offset correction are as described above, and a description is not repeated here. The distribution of pieces of the composite phosphor is determined also by, like in the fluorescence observation apparatus 1C, applying excitation light L11 and excitation light L21 in a time division manner and exciting only a single phosphor in a specific time cross section.

4. Example of hardware configuration of control device

Figure 13:
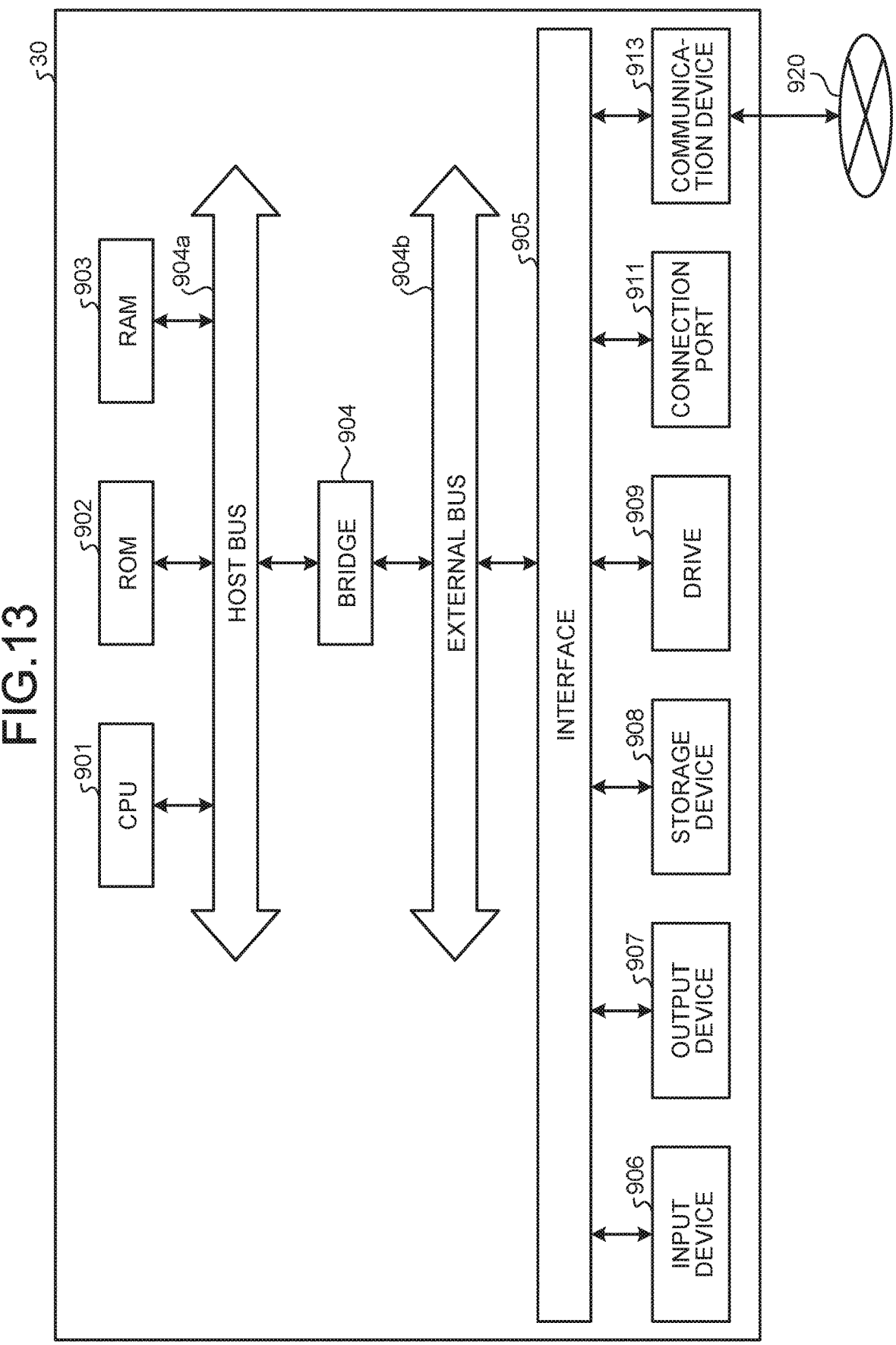
FIG. 13 is a block diagram illustrating a hardware configuration example of a control device.

FIG. 13 is a block diagram illustrating a hardware configuration example of a control device. In the following, the control device 30 (see FIGS. 1A, 1B, 3, etc.) is described. A similar description can be made for the control device 30C (see FIGS. 10A, 10B, 11, etc.). Various pieces of processing by the control device 30 are implemented by cooperation of software (a program 32a) and hardware described below.

As illustrated in FIG. 13, the control device 30 includes a central processing unit (CPU) 901, a read only memory (ROM) 902, a random access memory (RAM) 903, and a host bus 904a. In addition, the control device 30 includes a bridge 904, an external bus 904b, an interface 905, an input device 906, an output device 907, a storage device 908, a drive 909, a connection port 911, and a communication device 913. The control device 30 may include a processing circuit such as a DSP or an ASIC instead of or in addition to the CPU 901.

The CPU 901 functions as an arithmetic processing device and a control device, and controls the overall operation in the information processing device 100 according to various programs. Furthermore, the CPU 901 may be a microprocessor. The ROM 902 stores programs, operation parameters, and the like used by the CPU 901. The RAM 903 temporarily stores programs used in the execution of the CPU 901, parameters that appropriately change in the execution, and the like. The CPU 901 can embody at least the calculation unit 33 of the control device 30, for example.

The CPU 901, the ROM 902, and the RAM 903 are mutually connected by a host bus 904a including a CPU bus and the like. The host bus 904a is connected to the external bus 904b such as a peripheral component interconnect/interface (PCI) bus via the bridge 904. Note that the host bus 904a, the bridge 904, and the external bus 904b are not necessarily separately configured and such functions may be mounted in a single bus.

The input device 906 is realized by a device through which a user inputs information, such as a mouse, a keyboard, a touch panel, a button, a microphone, a switch, and a lever, for example. In addition, the input device 906 may be a remote control device using infrared ray or other electric waves, or external connection equipment such as a cellular phone or a PDA corresponding to an operation of the control device 30, for example. Furthermore, the input device 906 may include an input control circuit or the like which generates an input signal on the basis of information input by the user using the aforementioned input means and outputs the input signal to the CPU 901, for example. The user of the input device 906 may input various types of data or instruct a processing operation for the control device 30 by operating the input device 906.

The output device 907 is formed of a device capable of visually or aurally notifying the user of the acquired information. Examples of such a device include a display device such as a CRT display device, a liquid crystal display device, a plasma display device, an EL display device, and a lamp, a sound output device such as a speaker and a headphone, a printer device, and the like. The output device 907 can embody at least the display unit 34 of the control device 30, for example.

The storage device 908 is a device for storing data. The storage device 908 is realized by, for example, a magnetic storage device such as an HDD, a semiconductor storage device, an optical storage device, a magneto-optical storage device, or the like. The storage device 908 may include a storage medium, a recording device that records data on the storage medium, a reading device that reads data from the storage medium, a deletion device that deletes data recorded on the storage medium, and the like. The storage device 908 stores programs executed by the CPU 901, various data, various data acquired externally, and the like. The storage device 908 can embody at least the storage unit 32 of the control device 30, for example.

The drive 909 is a reader/writer for storage media and is included in or externally attached to the information processing device 100. The drive 909 reads information recorded on a removable storage medium such as a mounted magnetic disk, optical disk, magneto-optical disk, or semiconductor memory, and outputs the information to the RAM 903. Furthermore, the drive 909 can also write information on a removable storage medium.

The connection port 911 is an interface connected to an external device, and is a connection port to an external device capable of transmitting data by, for example, a universal serial bus (USB).

The communication device 913 is, for example, a communication interface formed by a communication device or the like for connecting to the network 920. The communication device 913 is, for example, a communication card for wired or wireless local area network (LAN), long term evolution (LTE), Bluetooth (registered trademark), wireless USB (WUSB), or the like. Furthermore, the communication device 913 may be a router for optical communication, a router for asymmetric digital subscriber line (ADSL), a modem for various communications, or the like. For example, the communication device 913 can transmit and receive signals and the like to and from the Internet and other communication devices according to a predetermined protocol such as TCP/IP.

Note that the network 920 is a wired or wireless transmission path of information transmitted from a device connected to the network 920. For example, the network 920 may include a public network such as the Internet, a telephone network, or a satellite communication network, various local area networks (LANs) including Ethernet (registered trademark), a wide area network (WAN), or the like. Furthermore, the network 920 may include a dedicated line network such as an Internet protocol-virtual private network (IP-VPN).

Hereinbefore, a hardware configuration example capable of realizing the function of the control device 30 has been described above. The respective components may be implemented using universal members, or may be implemented by hardware specific to the functions of the respective components. Accordingly, according to a technical level at the time when the embodiments of the present disclosure are executed, it is possible to appropriately change hardware configurations to be used.

Note that a computer program (for example, the program 32a or the like) for realizing each function of the control device 30 as described above can be created and mounted on a PC or the like. Furthermore, a computer-readable recording medium storing such a computer program can also be provided. The recording medium includes, for example, a magnetic disk, an optical disk, a magneto-optical disk, a flash memory, and the like. Furthermore, the computer program described above may be distributed via, for example, a network without using a recording medium.

5. Effects The fluorescence observation apparatus described above is specified as follows, for example. As described with reference to FIGS. 1A, FIG. 1B, FIG. 2 to FIG. 7, etc., a fluorescence observation apparatus 1 includes an irradiation unit 10, a detection unit 20, and a calculation unit 33. The irradiation unit 10 applies excitation light L11 and excitation light L21 of mutually different wavelengths to spatially different positions of light condensing position F1 and light condensing position F2 in a biological sample 5 that is labeled with a composite phosphor containing two or more kinds of fluorescent molecules (for example, fluorescent molecule A and fluorescent molecule B) at a predetermined composition ratio. The detection unit 20 detects fluorescence L12 and fluorescence L22 generated at light condensing position F1 and light condensing position F2, respectively, by the application of the irradiation unit 10. The calculation unit 33 determines the distribution of pieces of the composite phosphor on the basis of fluorescence signal S1 and fluorescence signal S2 that are obtained from a detection result of the detection unit 20 and that show fluorescence intensities corresponding to positions in the biological sample 5 of fluorescence L12 and fluorescence L22, respectively.

Further, in the fluorescence observation apparatus 1C described with reference to FIGS. 10A, 10B, 11, 12, etc., the irradiation unit 10C applies excitation light L11 and excitation light L21 to temporally different positions of light condensing position F1C and light condensing position F2C in a biological sample 5. The calculation unit 33C determines the distribution of pieces of the composite phosphor on the basis of fluorescence signal S1 and fluorescence signal S2 that are obtained from a detection result of the detection unit 20 and that show fluorescence intensities corresponding to positions in the biological sample 5 of fluorescence L12 and fluorescence L22, respectively.

By the fluorescence observation apparatus 1 or the fluorescence observation apparatus 1C described above, as described with reference to FIG. 4 to FIG. 6, etc., the resolution of fluorescence detection can be improved by using a plurality of fluorescence signals S1 and S2, as compared to, for example, the case where a single fluorescence signal is used.

The irradiation unit 10 may scan the biological sample 5 with excitation light L11 and excitation light L21. Light condensing position F1 and light condensing position F2 may be a plurality of positions spatially different in scanning. Fluorescence signal S1 and fluorescence signal S2 may show fluorescence intensities corresponding to scanning positions in the biological sample 5 of fluorescence L12 and fluorescence L22, respectively. The calculation unit 33 may determine the distribution of pieces of the composite phosphor on the basis of fluorescence signal S1 and fluorescence signal S2 of fluorescence L12 and fluorescence L22 corresponding to scanning positions in the biological sample 5. Further, light condensing position F1C and light condensing position F2C based on the irradiation unit 10C may be a plurality of positions temporally different in scanning. The calculation unit 33C may determine the distribution of pieces of the composite phosphor on the basis of fluorescence signal S1 and fluorescence signal S2 of fluorescence L12 and fluorescence L22 corresponding to scanning positions in the biological sample 5. Thereby, the distribution of pieces of the composite phosphor in the scanning range of the biological sample 5 can be determined.

As described with reference to FIG. 2, etc., fluorescent molecule A and fluorescent molecule B may have mutually different excitation fluorescence characteristics, and may be molecularly bonded. Fluorescent molecule A may, when irradiated with excitation light L11 of a first wavelength $\lambda_1$, generate fluorescence L12 of a first spectrum. Fluorescent molecule B may, when irradiated with excitation light L21 of a second wavelength $\lambda_2$, generate fluorescence L22 of a second spectrum. By such a process in which the biological sample 5 is stained with a composite phosphor in which fluorescent molecules having different excitation fluorescence characteristics are molecularly bonded, the same position (point) in the biological sample 5 can be provided with the excitation fluorescence characteristics of both fluorescent molecule A and fluorescent molecule B.

As described with reference to FIG. 4 to FIG. 6, etc., each of the calculation unit 33 and the calculation unit 33C may determine the distribution of pieces of the composite phosphor by multiplying together fluorescence signal S1 and fluorescence signal S2 of excitation light L11 and excitation light L21 for each position in the biological sample 5. In this case, each of the calculation unit 33 and the calculation unit 33C may multiply together fluorescence signal S1 and fluorescence signal S2 of fluorescent molecule A and fluorescent molecule B with a ratio corresponding to the predetermined composition ratio. Each of the calculation unit 33 and the calculation unit 33C may raise each of fluorescence signal S1 and fluorescence signal S2 of fluorescent molecule A and fluorescent molecule B to the power of a ratio corresponding to the predetermined composition ratio. By multiplying together fluorescence signal S1 and fluorescence signal S2 in this manner, a synthesized fluorescence signal S with a narrow peak width is obtained, and as a result the resolution of fluorescence detection can be improved.

The detection unit 20 may detect spectra of fluorescence L12 and fluorescence L22. Each of the calculation unit 33 and the calculation unit 33C may calculate the fluorescence intensity from the inner product of a spectrum detected by the detection unit 20 and a predetermined spectrum. The fluorescence intensities of fluorescence L12 and fluorescence L22 corresponding to positions in the biological sample 5 can be calculated in this manner, for example.

Each of the irradiation unit 10 and the irradiation unit 10C may scan excitation light L11 and excitation light L21 in the depth direction (Z-axis direction) of the biological sample 5. Thereby, the distribution of pieces of the composite phosphor inside the biological sample 5 can be determined.

Each of the irradiation unit 10 and the irradiation unit 10C may scan excitation light L11 and excitation light L21 in a two-dimensional direction (two axial directions among the X-axis direction, the Y-axis direction, and the Z-axis direction). Each of the calculation unit 33 and the calculation unit 33C may generate a two-dimensional fluorescence image from fluorescence signal S1 and fluorescence signal S2 corresponding to positions in the biological sample 5 of fluorescence L12 and fluorescence L22. Thereby, a two-dimensional image with improved resolution can be obtained.

Each of the calculation unit 33 and the calculation unit 33C may calculate the number of fluorescent molecules for each position in the biological sample 5 from fluorescence signal S1 and fluorescence signal S2 corresponding to positions in the biological sample 5 of excitation light L11 and excitation light L21. The number of fluorescent molecules at each position can be grasped with high resolution.

As in the irradiation unit 10, excitation light L11 and excitation light L21 may be simultaneously applied to light condensing position F1 and light condensing position F2 that are spatially different. As in the irradiation unit 10C, excitation light L11 and excitation light L21 may be applied in a time division manner to light condensing position F1C and light condensing position F2C that are spatially identical. Thereby, the composite phosphor present at each light condensing position predominantly generates fluorescence L12 or fluorescence L22 only when condensation of fluorescence L12 or excitation light L21 reaches the composite phosphor itself, and therefore mixing of signals from other phosphors can be suppressed. That is, the separation ability of each piece of fluorescence can be enhanced.

As in the irradiation unit 10B described with reference to FIGS. 9A and 9B, a lens 14B1 and a lens 14B2 provided for light condensing position F1B and light condensing position F2B, respectively, may be provided. Thereby, excitation light L11 and excitation light L21 can be caused to be incident on the biological sample 5 from a plurality of optical axes.

The control device 30 may be provided separately from the fluorescence observation apparatus 1; in this case, a fluorescence observation system including: a fluorescence observation apparatus including an irradiation unit 10 and a detection unit 20; and software (a program 32a) used for processing using a detection result of the detection unit 20 is provided (the same applies to the control device 30C, the program 32aC, etc.). Also such a fluorescence observation system is an aspect of the present disclosure. The software is executed by the fluorescence observation apparatus, and implements the determination of the distribution of pieces of the composite phosphor on the basis of fluorescence signal S1 and fluorescence signal S2 obtained from a detection result of the detection unit 20. The resolution of fluorescence detection can be improved also by the fluorescence observation system.

Also the fluorescence observation method described with reference to FIG. 7, etc. is an aspect of the present disclosure. That is, the fluorescence observation method applies excitation light L11 and excitation light L21 to light condensing position F1 and light condensing position F2 (which may be light condensing position F1A and light condensing position F2A, light condensing position F1B and light condensing position F2B, or light condensing position F1C and light condensing position F2C) (step S102), detects fluorescence L12 and fluorescence L22 generated at light condensing position F1 and light condensing position F2 (which may be light condensing position F1A and light condensing position F2A, light condensing position F1B and light condensing position F2B, or light condensing position F1C and light condensing position F2C) by irradiation (step S103), and determines the distribution of pieces of the composite phosphor on the basis of fluorescence signal S1 and fluorescence signal S2 obtained from the detection result (step S104). The resolution of fluorescence detection can be improved also by such a fluorescence observation method.

The effects described in the present disclosure are merely examples, and the present disclosure is not limited to the disclosed contents. There may be other effects.

Hereinabove, embodiments of the present disclosure are described; however, the technical scope of the present disclosure is not limited to the above-described embodiments as they are, and various changes can be made without departing from the gist of the present disclosure. Further, constituent elements of different embodiments and modification examples may be combined as appropriate.

Further, the effects in the embodiments described in the present specification are merely examples and are not limitative ones, and there may be other effects.

For example, the above embodiment describes an example in which the composite phosphor contains two kinds of fluorescent molecules. However, the composite phosphor may contain three or more kinds of fluorescent molecules. In this case, the irradiation unit and the detection unit may be appropriately changed so as to apply a certain number of kinds of excitation light corresponding to the excitation fluorescence characteristics of the fluorescent molecules and detect the corresponding kinds of fluorescence.

The present technology can also have the following configurations.

(1)

A fluorescence observation apparatus comprising:
an irradiation unit that applies a plurality of kinds of excitation light of mutually different wavelengths to a plurality of spatially or temporally different positions in a biological sample that is labeled with a composite phosphor containing two or more kinds of fluorescent molecules at a predetermined composition ratio;
a detection unit that detects fluorescence generated at each of the plurality of positions by application of the irradiation unit; and
a calculation unit that determines a distribution of pieces of the composite phosphor on the basis of a fluorescence signal that is obtained from a detection result of the detection unit and that shows a fluorescence intensity corresponding to a position in the biological sample of each piece of the fluorescence.

(2)

The fluorescence observation apparatus according to (1), wherein
the irradiation unit scans the biological sample with the plurality of kinds of excitation light,
the plurality of positions are a plurality of positions temporally or spatially different in scanning,
the fluorescence signal shows a fluorescence intensity corresponding to a scanning position in the biological sample of each piece of the fluorescence, and
the calculation unit determines a distribution of pieces of the composite phosphor on the basis of the fluorescence signal of each piece of the fluorescence corresponding to the scanning position in the biological sample.

(3)

The fluorescence observation apparatus according to (1) or (2), wherein
the two or more kinds of fluorescent molecules have mutually different excitation fluorescence characteristics, and are molecularly bonded.

(4)

The fluorescence observation apparatus according to (3), wherein the two or more kinds of fluorescent molecules include a fluorescent molecule that generates fluorescence of a first spectrum when irradiated with excitation light of a first wavelength and a fluorescent molecule that generates fluorescence of a second spectrum different from the first spectrum when irradiated with excitation light of a second wavelength different from the first wavelength.

(5)
The fluorescence observation apparatus according to any one of (1) to (4), wherein
the calculation unit determines a distribution of pieces of the composite phosphor by multiplying together the fluorescence signals of the pieces of the fluorescence for each position in the biological sample.

(6)
The fluorescence observation apparatus according to (5), wherein
the calculation unit multiplies together the fluorescence signals of each of the kinds of fluorescent molecules with a ratio corresponding to the predetermined composition ratio.

(7)
The fluorescence observation apparatus according to (6), wherein
the calculation unit raises the fluorescence signal of each of the kinds of fluorescent molecules to a power of a ratio corresponding to the predetermined composition ratio.

(8)
The fluorescence observation apparatus according to any one of (1) to (7), wherein
the detection unit detects a spectrum of the fluorescence, and
the calculation unit calculates the fluorescence intensity from an inner product of a spectrum detected by the detection unit and a predetermined spectrum.

(9)
The fluorescence observation apparatus according to any one of (1) to (8), wherein
the irradiation unit scans the plurality of kinds of excitation light in a depth direction of the biological sample.

(10)
The fluorescence observation apparatus according to any one of (1) to (9), wherein
the irradiation unit scans the plurality of kinds of excitation light in a two-dimensional direction, and
the calculation unit generates a two-dimensional fluorescence image from the fluorescence signal corresponding to a position in the biological sample of each piece of the fluorescence.

(11)
The fluorescence observation apparatus according to any one of (1) to (10), wherein
the calculation unit calculates a number of fluorescent molecules for each position in the biological sample from the fluorescence signal corresponding to a position in the biological sample of each piece of the fluorescence.

(12)
The fluorescence observation apparatus according to any one of (1) to (11), wherein
the plurality of positions are the plurality of spatially different positions, and
the irradiation unit simultaneously applies the kinds of excitation light of mutually different wavelengths to the plurality of positions.

(13)
The fluorescence observation apparatus according to (12), wherein
the irradiation unit includes a lens provided for each of the plurality of positions.

(14)
The fluorescence observation apparatus according to any one of (1) to (11), wherein
the plurality of positions are the plurality of temporally different positions, and
the irradiation unit applies the plurality of kinds of excitation light to spatially identical positions in the biological sample in a time division manner.

(15)
A fluorescence observation system comprising:
a fluorescence observation apparatus including an irradiation unit that applies a plurality of kinds of excitation light of mutually different wavelengths to a plurality of spatially or temporally different positions in a biological sample that is labeled with a composite phosphor containing two or more kinds of fluorescent molecules at a predetermined composition ratio and a detection unit that detects fluorescence generated at each of the plurality of positions by application of the irradiation unit; and software used for processing using a detection result of the detection unit, wherein
the software is executed by the fluorescence observation apparatus, and
implements determination of a distribution of pieces of the composite phosphor on the basis of a fluorescence signal that is obtained from a detection result of the detection unit and that shows a fluorescence intensity corresponding to a position in the biological sample of each piece of the fluorescence.

(16)
A fluorescence observation method comprising:
applying a plurality of kinds of excitation light of mutually different wavelengths to a plurality of spatially or temporally different positions in a biological sample that is labeled with a composite phosphor containing two or more kinds of fluorescent molecules at a predetermined composition ratio;
detecting fluorescence generated at each of the plurality of positions by the applying; and
determining a distribution of pieces of the composite phosphor on the basis of a fluorescence signal that is obtained from a result of the detecting and that shows a fluorescence intensity corresponding to a position in the biological sample of each piece of the fluorescence.

REFERENCE SIGNS LIST

1 FLUORESCENCE OBSERVATION APPARATUS
5 BIOLOGICAL SAMPLE
10 IRRADIATION UNIT
11 LIGHT SOURCE
12 MIRROR
13 MIRROR
14 LENS
15 STAGE
20 DETECTION UNIT
21 SLIT
22 PHOTOSENSOR
30 CONTROL DEVICE
31 IRRADIATION CONTROL UNIT
32 STORAGE UNIT
33 CALCULATION UNIT

33a FLUORESCENCE INTENSITY CALCULATION UNIT
33b OFFSET CORRECTION UNIT
33c SYNTHESIZED FLUORESCENCE SIGNAL GENERATION UNIT
33d IMAGE GENERATION UNIT
33e NUMBER-OF-FLUORESCENT-MOLECULES CALCULATION UNIT
34 DISPLAY UNIT

The invention claimed is:

1. A fluorescence observation apparatus, comprising:
an irradiation unit configured to apply a plurality of kinds of excitation light of mutually different wavelengths to a plurality of spatially or temporally different positions in a biological sample that is labeled with a composite phosphor, wherein the composite phosphor includes two or more kinds of fluorescent molecules at a specific composition ratio;
a detection unit configured to detect fluorescence generated at each of the plurality of spatially or temporally different positions, wherein the fluorescence is generated based on the application of the plurality of kinds of excitation light by the irradiation unit; and
a calculation unit configured to determine a distribution of pieces of the composite phosphor based on a fluorescence signal of each piece of the detected fluorescence, wherein
the fluorescence signal is obtained based on a detection result of the detection unit, and
the fluorescence signal shows a fluorescence intensity corresponding to a position of the plurality of spatially or temporally different positions in the biological sample.

2. The fluorescence observation apparatus according to claim 1, wherein
the irradiation unit is further configured to scan the biological sample with the plurality of kinds of excitation light,
the plurality of spatially or temporally different positions are a temporally or spatially different in scanning,
the fluorescence signal shows a fluorescence intensity corresponding to a scanning position in the biological sample, and
the calculation unit is further configured to determine the distribution of the pieces of the composite phosphor based on the fluorescence signal of the each piece of the detected fluorescence, wherein the fluorescence signal corresponds to the scanning position in the biological sample.

3. The fluorescence observation apparatus according to claim 1, wherein
the two or more kinds of fluorescent molecules have mutually different excitation fluorescence characteristics, and
the two or more kinds of fluorescent molecules are molecularly bonded.

4. The fluorescence observation apparatus according to claim 3, wherein
the two or more kinds of fluorescent molecules include:
a first fluorescent molecule that generates fluorescence of a first spectrum based on irradiation with first excitation light of a first wavelength, and
a second fluorescent molecule that generates fluorescence of a second spectrum based on irradiation with second excitation light of a second wavelength different from the first wavelength, wherein
the second spectrum is different from the first spectrum, and
the plurality of kinds of excitation light includes the first excitation light and the second excitation light.

5. The fluorescence observation apparatus according to claim 1, wherein
the calculation unit is further configured to determine the distribution of the pieces of the composite phosphor based on multiplication of the fluorescence signal of the each piece of the detected fluorescence for each position of the plurality of spatially or temporally different positions in the biological sample.

6. The fluorescence observation apparatus according to claim 5, wherein
the calculation unit is further configured to multiply the fluorescence signal of each of the two or more kinds of fluorescent molecules with a ratio corresponding to the specific composition ratio.

7. The fluorescence observation apparatus according to claim 6, wherein
the calculation unit is further configured to raise the fluorescence signal of the each of the two or more kinds of fluorescent molecules to a power of a ratio corresponding to the specific composition ratio.

8. The fluorescence observation apparatus according to claim 1, wherein
the detection unit is further configured to detect a spectrum of the fluorescence, and
the calculation unit is further configured to calculate the fluorescence intensity based on an inner product of the spectrum detected by the detection unit and a specific spectrum.

9. The fluorescence observation apparatus according to claim 1, wherein
the irradiation unit is further configured to scan the plurality of kinds of excitation light in a depth direction of the biological sample.

10. The fluorescence observation apparatus according to claim 1, wherein
the irradiation unit is further configured to scan the plurality of kinds of excitation light in a two-dimensional direction, and
the calculation unit is further configured to generate a two-dimensional fluorescence image from the fluorescence signal of the each piece of the detected fluorescence, wherein the fluorescence signal corresponds to a position of the plurality of spatially or temporally different positions in the biological sample.

11. The fluorescence observation apparatus according to claim 1, wherein
the calculation unit is further configured to calculate a number of the two or more kinds of fluorescent molecules for each position of the plurality of spatially or temporally different positions in the biological sample from the fluorescence signal of the each piece of the detected fluorescence, and
the fluorescence signal corresponds to the position in the biological sample.

12. The fluorescence observation apparatus according to claim 1, wherein
the plurality of spatially or temporally different positions are a plurality of spatially different positions, and
the irradiation unit is further configured to simultaneously apply the plurality of kinds of excitation light of mutually different wavelengths to the plurality of spatially different positions.

13. The fluorescence observation apparatus according to claim 12, wherein
the irradiation unit includes a lens for each of the plurality of spatially or temporally different positions.

14. The fluorescence observation apparatus according to claim 1, wherein
the plurality of spatially or temporally different positions are a plurality of temporally different positions, and
the irradiation unit is further configured to apply the plurality of kinds of excitation light to spatially identical positions in the biological sample in a time division manner.

15. A fluorescence observation system, comprising:
a fluorescence observation apparatus that comprises:
an irradiation unit configured to apply a plurality of kinds of excitation light of mutually different wavelengths to a plurality of spatially or temporally different positions in a biological sample that is labeled with a composite phosphor, wherein the composite phosphor includes two or more kinds of fluorescent molecules at a specific composition ratio; and
a detection unit configured to detect fluorescence generated at each of the plurality of spatially or temporally different positions, wherein the fluorescence is generated based on the application of the plurality of kinds of excitation light by the irradiation unit; and
a processing unit configured to process a detection result of the detection unit, wherein
the processing unit is executed by the fluorescence observation apparatus, and
the processing unit is configured to determine a distribution of pieces of the composite phosphor based on a fluorescence signal of each piece of the detected fluorescence, wherein
the fluorescence signal is obtained based on the detection result of the detection unit, and
the fluorescence signal shows a fluorescence intensity corresponding to a position of the plurality of spatially or temporally different positions in the biological sample.

16. A fluorescence observation method, comprising:
applying a plurality of kinds of excitation light of mutually different wavelengths to a plurality of spatially or temporally different positions in a biological sample that is labeled with a composite phosphor, wherein the composite phosphor includes or more kinds of fluorescent molecules at a predetermined specific composition ratio;
detecting fluorescence generated at each of the plurality of spatially or temporally different positions, wherein the fluorescence is generated based on the application of the plurality of kinds of excitation light; and
determining a distribution of pieces of the composite phosphor based on a fluorescence signal of each piece of the detected fluorescence, wherein
the fluorescence signal is obtained based on a result of the detecting, and
the fluorescence signal shows a fluorescence intensity corresponding to a position of the plurality of spatially or temporally different positions in the biological sample.

* * * * *